Feb. 5, 1924.

T. C. MOORSHEAD 1,482,762

GLASS SHAPING MACHINE

Filed July 26, 1918 14 Sheets-Sheet 1

INVENTOR.
THOMAS C. MOORSHEAD,
by John N. Bruninga
ATTORNEY.

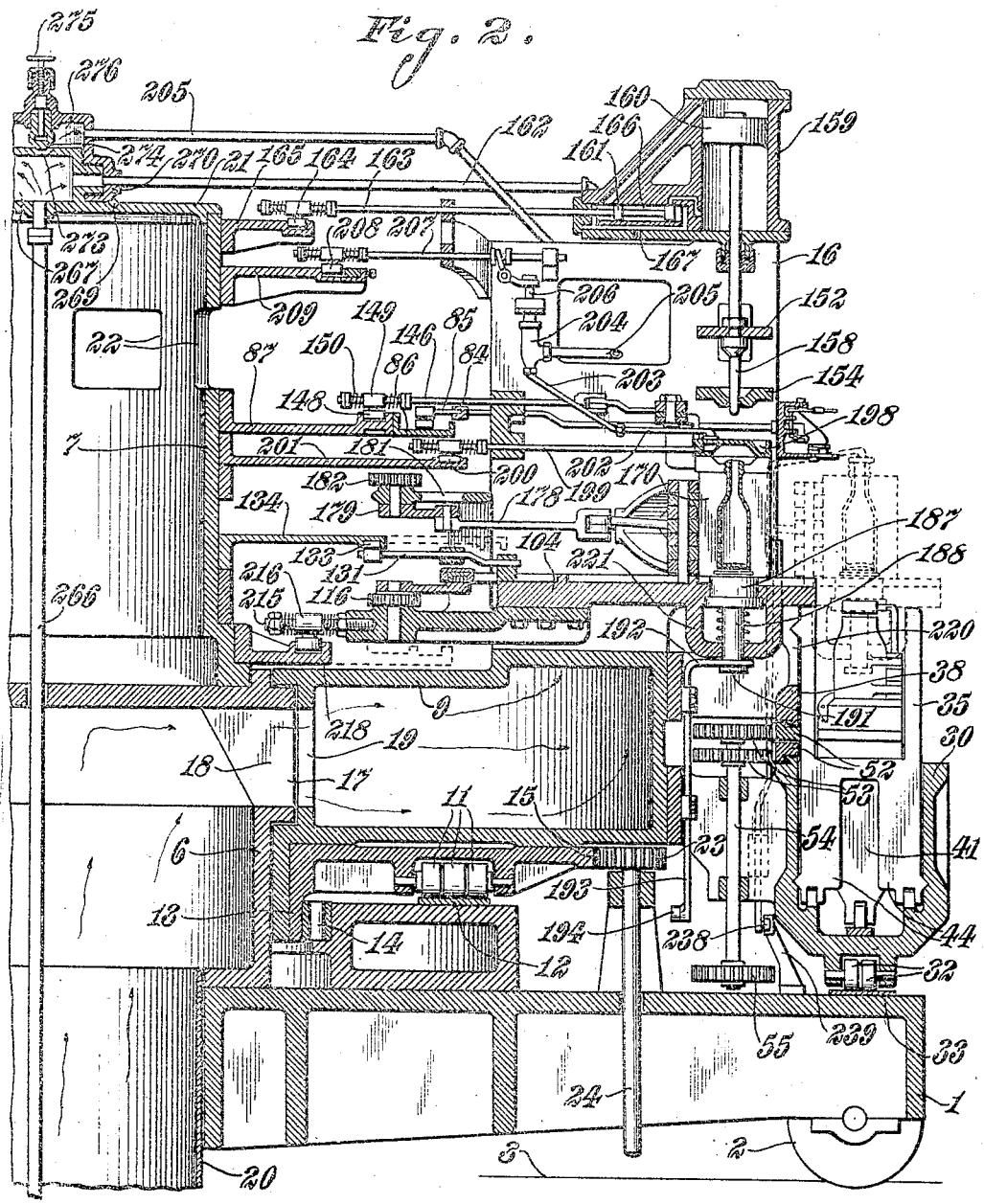

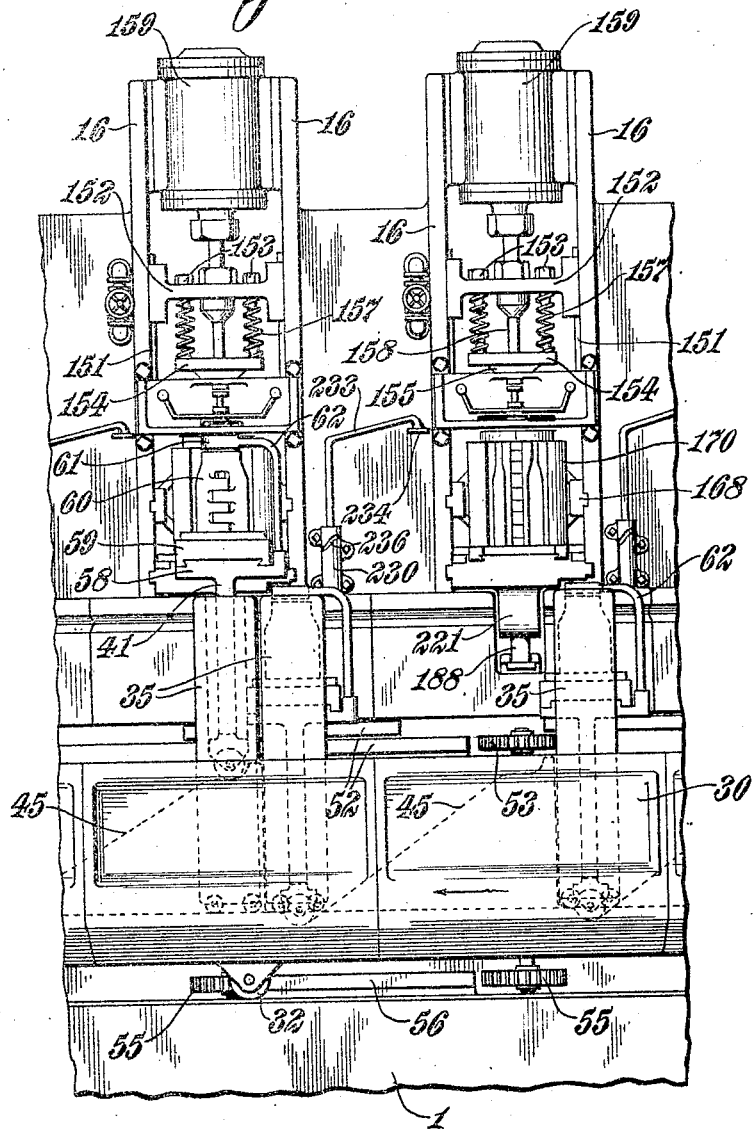

Feb. 5, 1924.

T. C. MOORSHEAD 1,482,762

GLASS SHAPING MACHINE

Filed July 26, 1918     14 Sheets-Sheet 4

INVENTOR.
THOMAS C. MOORSHEAD,
BY John N. Bruninga
ATTORNEY.

Feb. 5, 1924. 1,482,762
T. C. MOORSHEAD
GLASS SHAPING MACHINE
Filed July 26, 1918 14 Sheets-Sheet 5

INVENTOR.
THOMAS C. MOORSHEAD,
ATTORNEY.

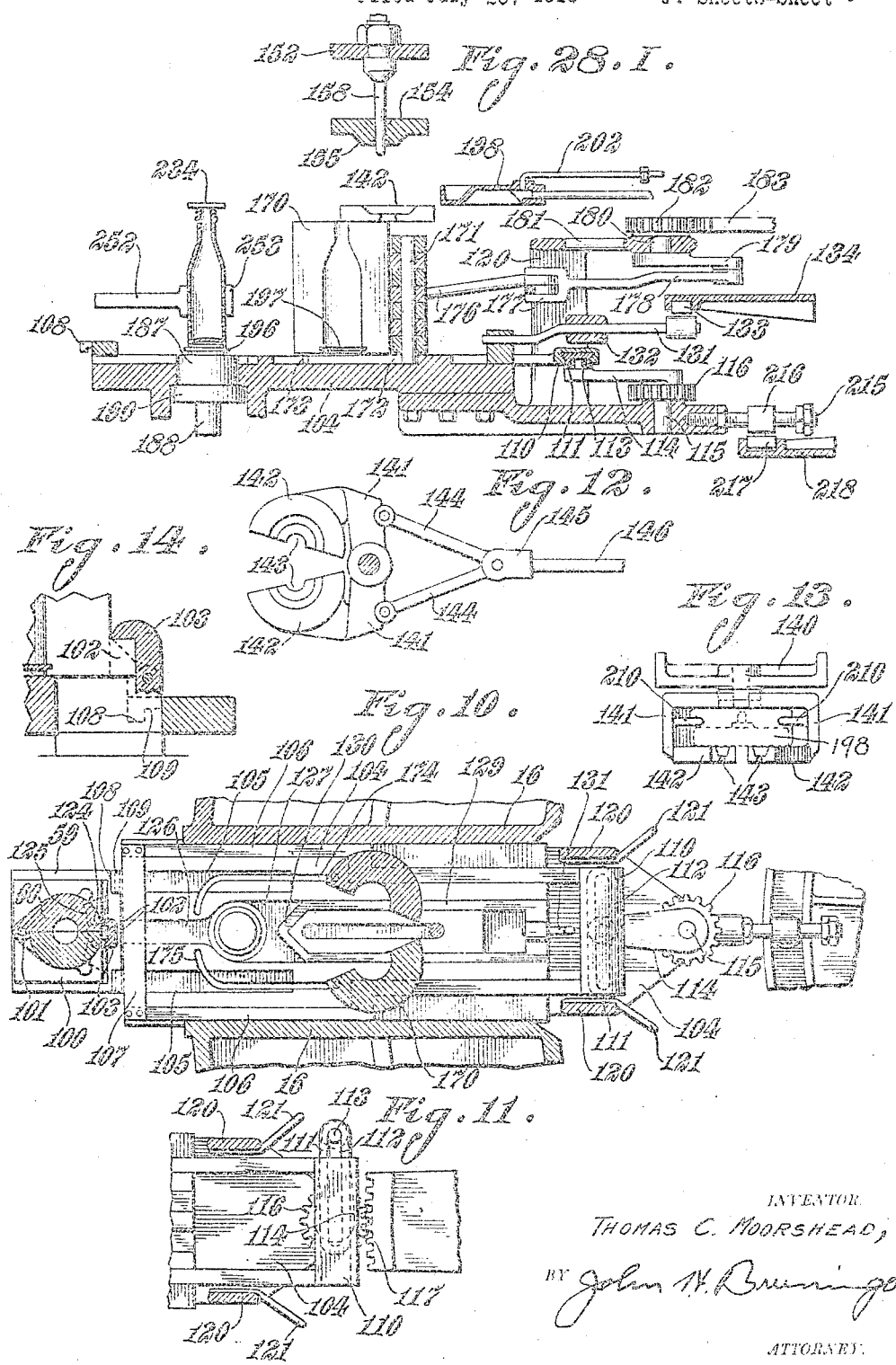

Feb. 5, 1924.
T. C. MOORSHEAD
GLASS SHAPING MACHINE
Filed July 26, 1918    14 Sheets-Sheet 7
1,482,762
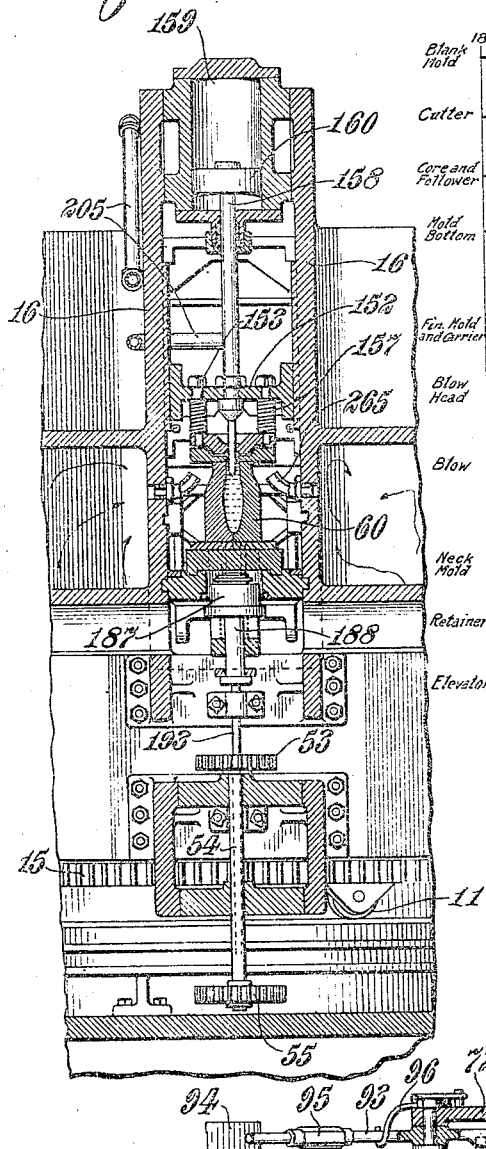
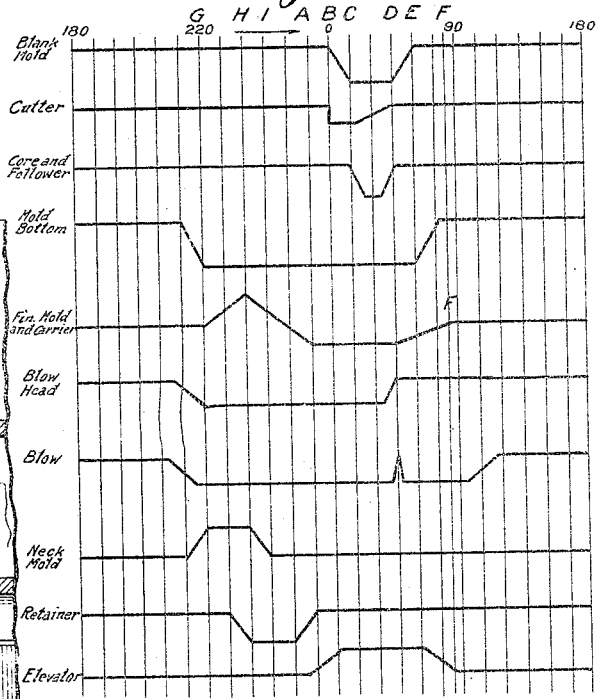
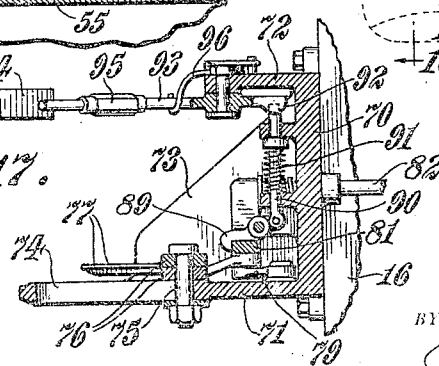
INVENTOR.
THOMAS C. MOORSHEAD,
BY John H. Bruninga
ATTORNEY.

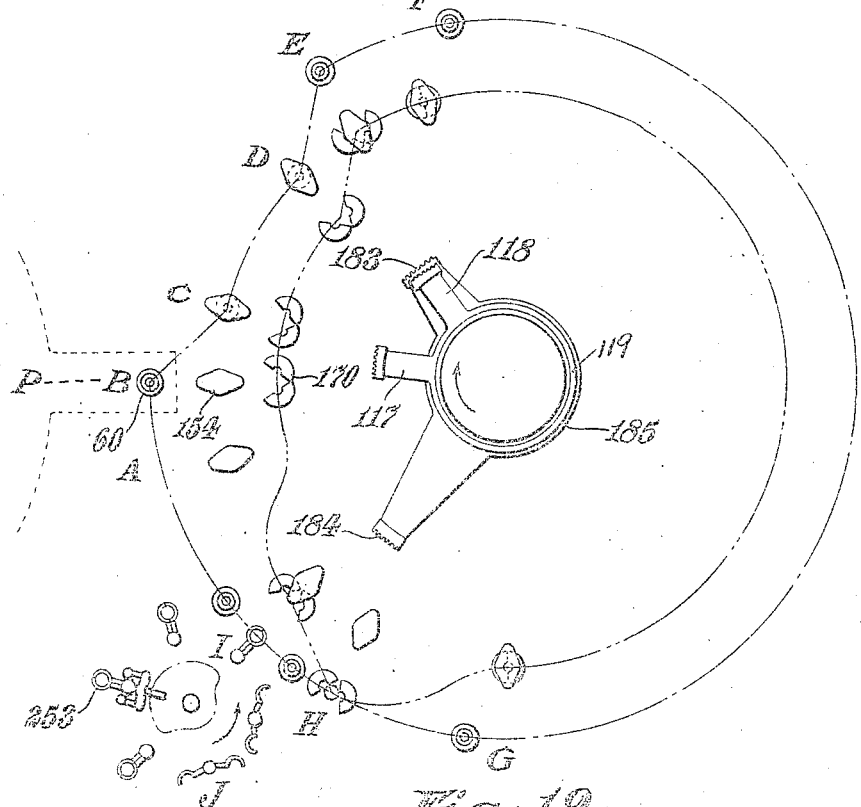
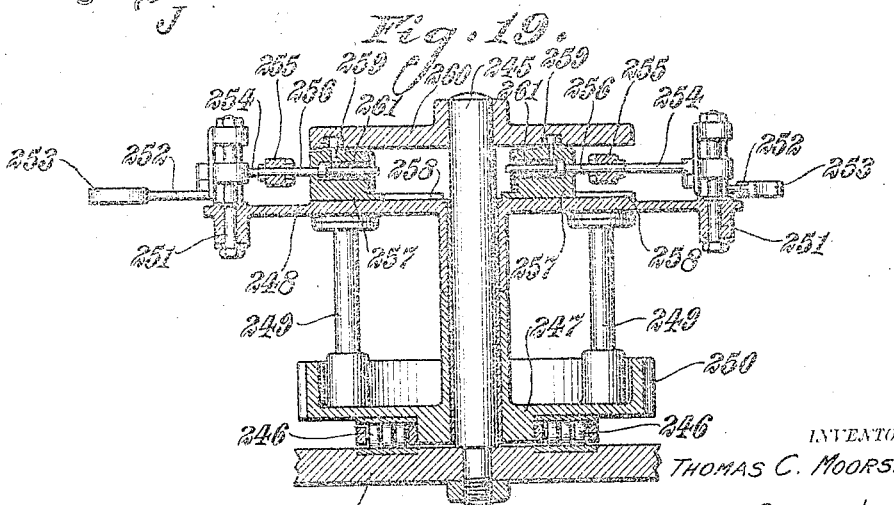

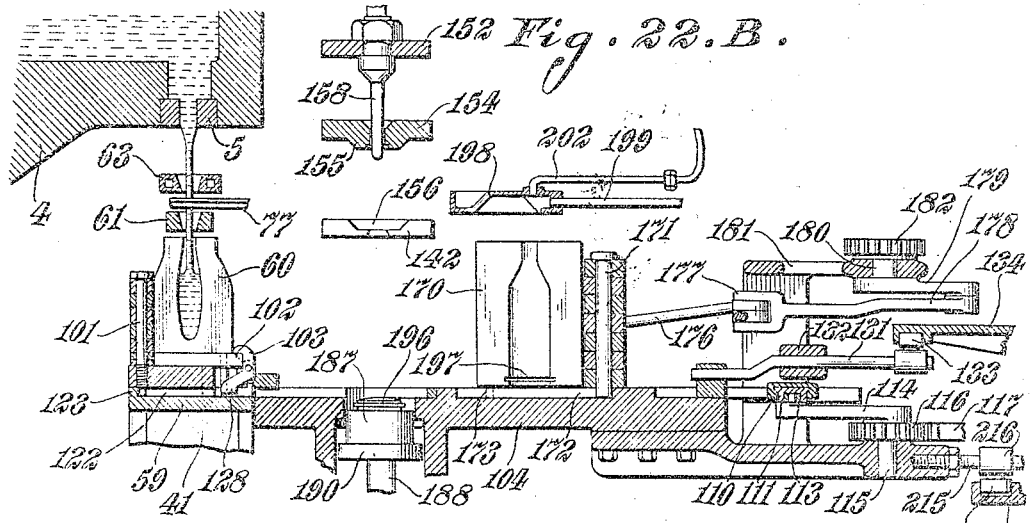
Fig. 22. B.
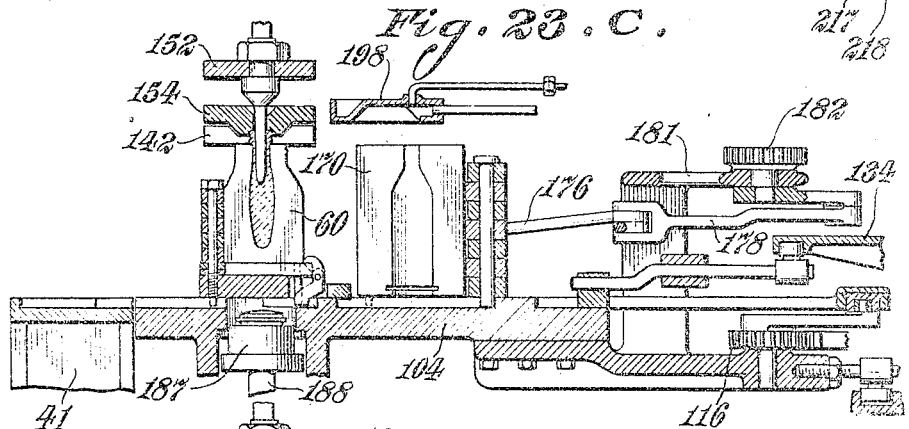
Fig. 23. C.
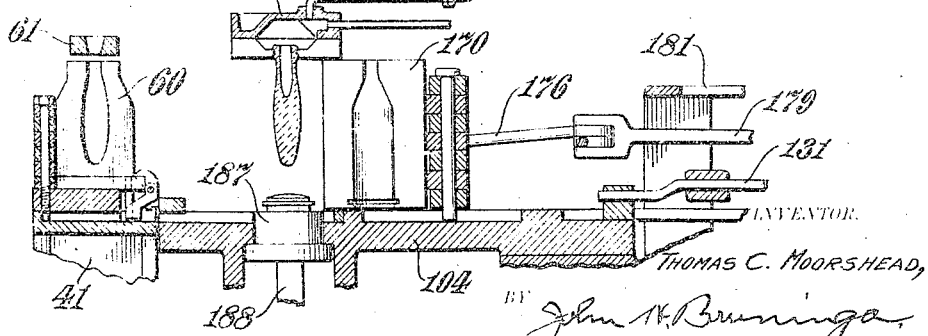
Fig. 24. D.

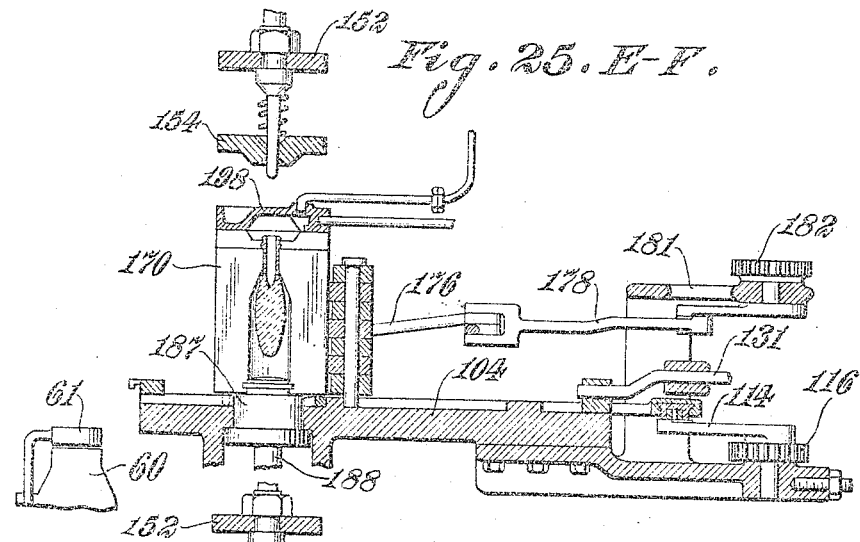
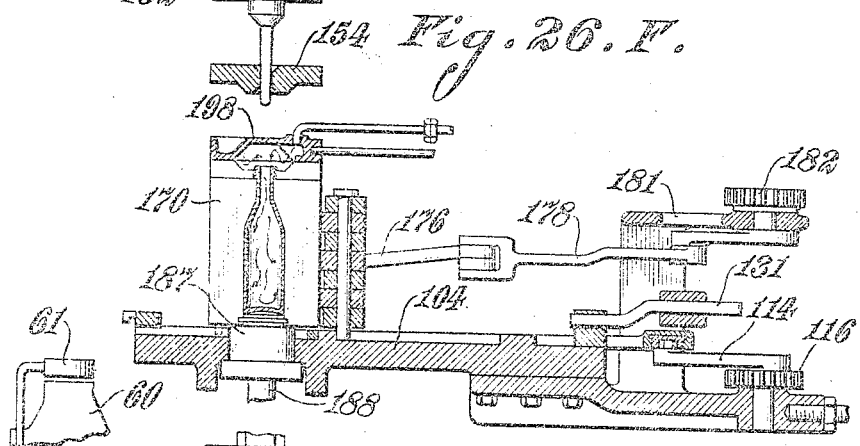
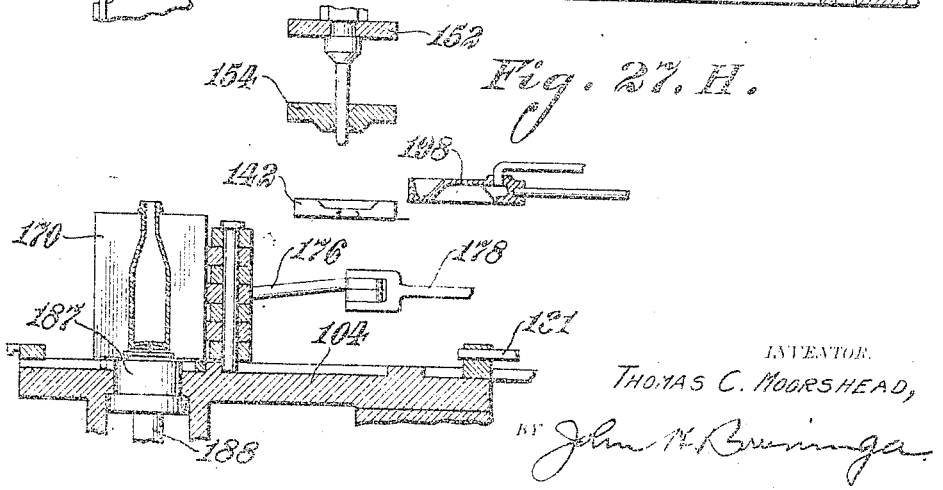

Feb. 5, 1924.

T. C. MOORSHEAD 1,482,762

GLASS SHAPING MACHINE

Filed July 26, 1918     14 Sheets-Sheet 11

INVENTOR.
THOMAS C. MOORSHEAD,
BY John H. Bruninga
ATTORNEY.

Feb. 5, 1924.
T. C. MOORSHEAD
GLASS SHAPING MACHINE
Filed July 26, 1918  14 Sheets-Sheet 12
1,482,762
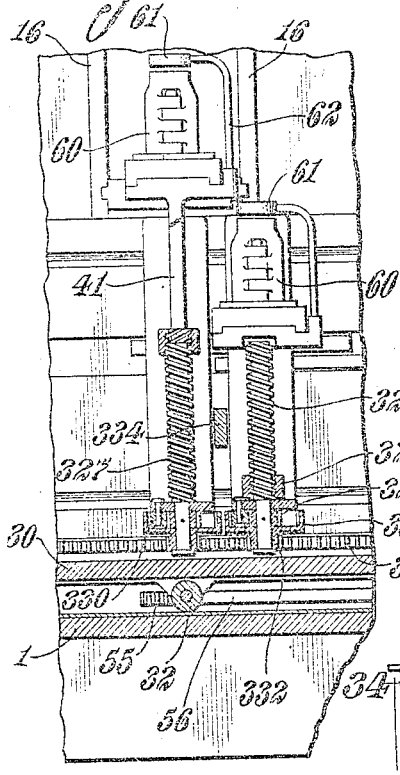
Fig. 34.
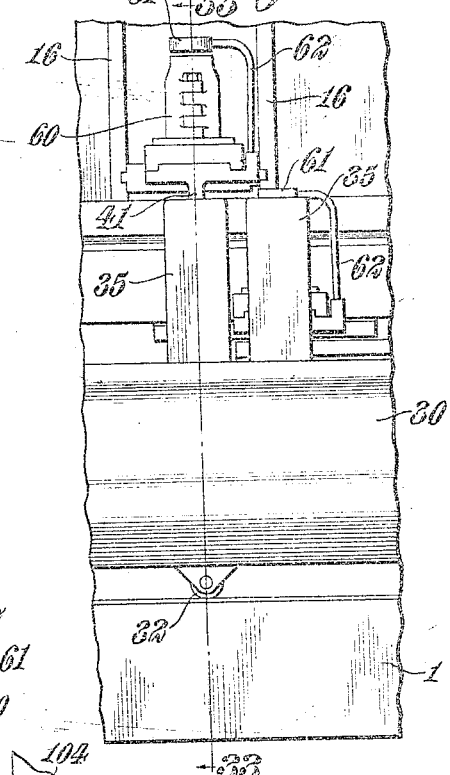
Fig. 32.
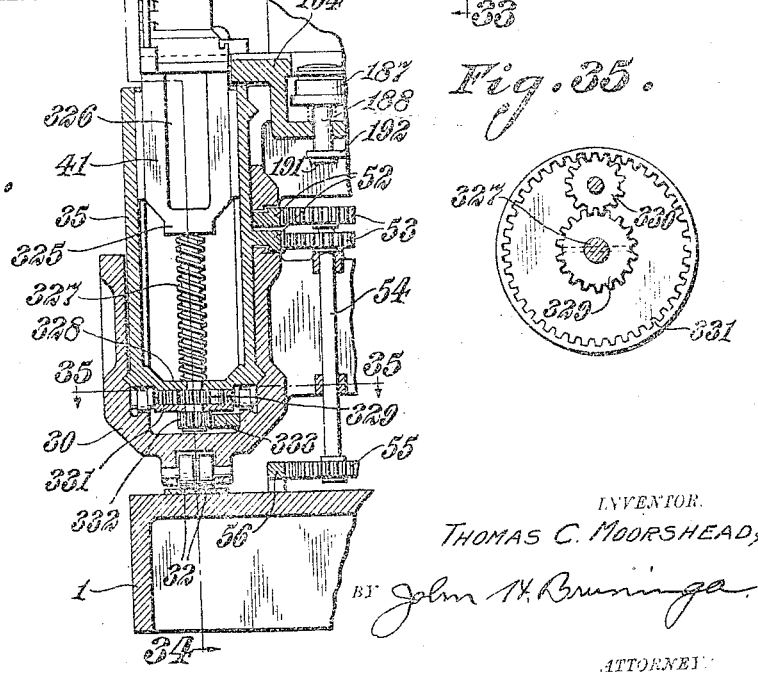
Fig. 33.
Fig. 35.
INVENTOR.
THOMAS C. MOORSHEAD,
BY John H. Bruninga
ATTORNEY

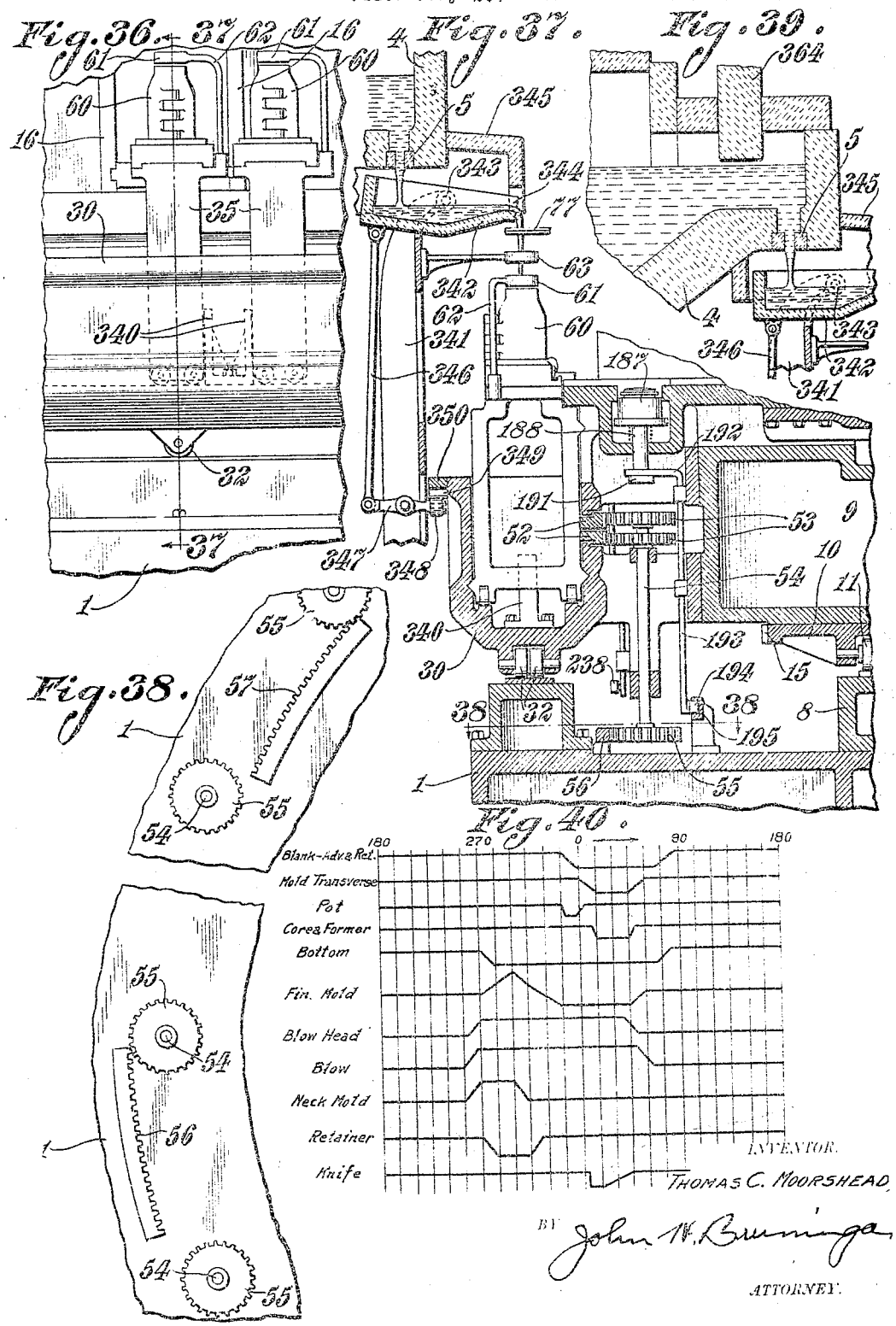

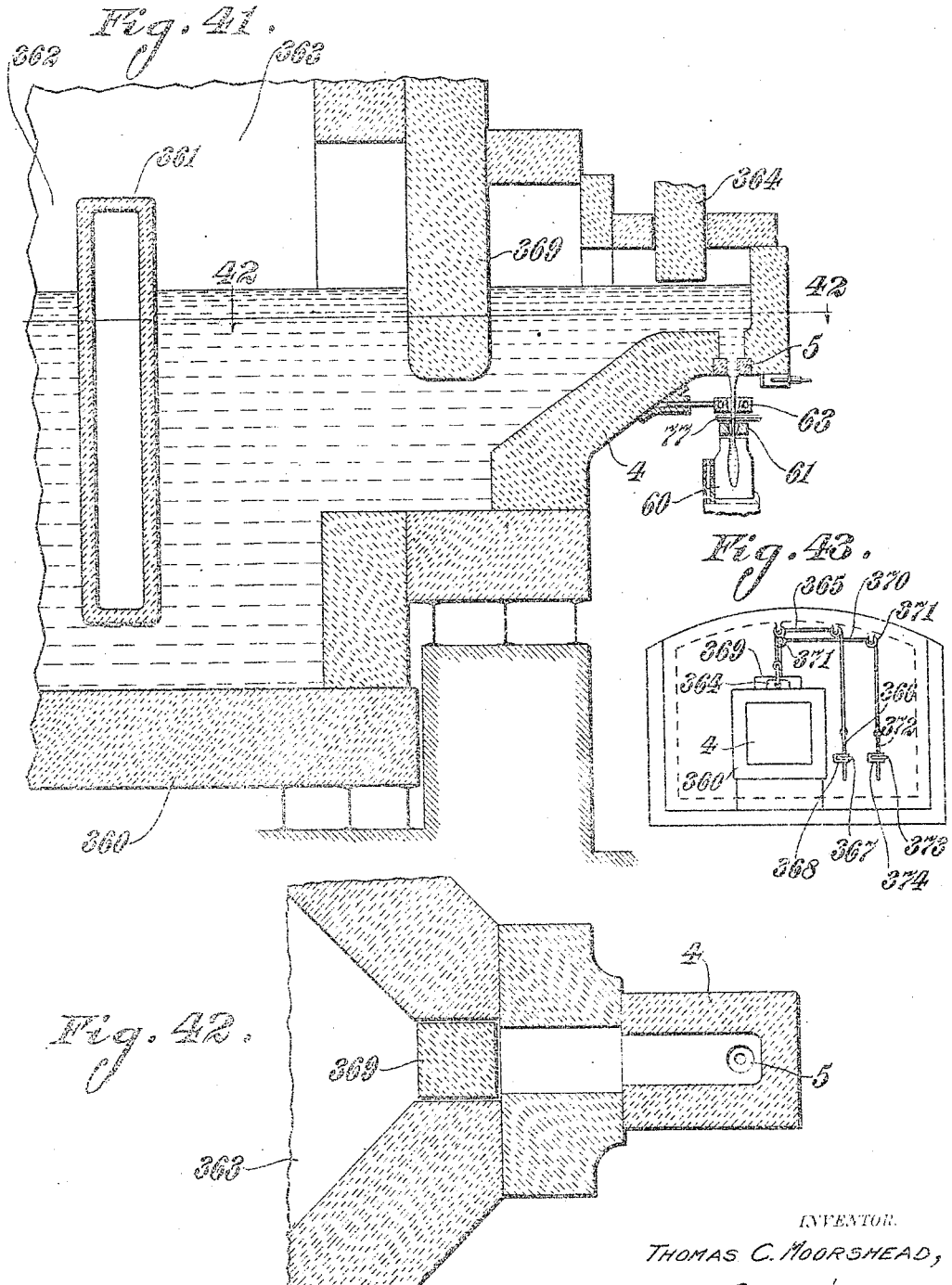

Patented Feb. 5, 1924.

1,482,762

UNITED STATES PATENT OFFICE.

THOMAS C. MOORSHEAD, OF ALTON, ILLINOIS.

GLASS-SHAPING MACHINE.

Application filed July 26, 1918. Serial No. 246,379.

*To all whom it may concern:*

Be it known that I, THOMAS C. MOORSHEAD, a citizen of the United States, and residing at Alton, county of Madison, State of Illinois, have invented a certain new and useful Improvement in Glass-Shaping Machines, of which the following is a specification.

This invention relates to an apparatus and method for shaping glass.

Glass shaping machines are of two general types, namely: the vacuum type and the gravity type.

In the vacuum type, the blank mold is filled by exhausting the blank mold, so that the glass is forced into the mold by atmospheric pressure. This construction is, however, open to the objections that the cost of exhausting the blank mold, on account of the leakage, is very high, requiring, as it does, a large exhaust pump, and it is also open to the objections that since the supply must be cut off by a cutter exposed to chilling action, it leaves a line or wrinkle at the bottom of the blown article. Moreover, such a machine requires the use of a rotating glass tank, which is not only expensive to construct, but expensive to maintain and operate, on account of the high cost of construction, repair and the great amount of fuel required to heat it. Furthermore, in view of the fact that such a tank necessarily exposes a large surface of molten glass, the radiated heat will be large, which not only renders the operation, lubrication and maintenance of a machine a difficult matter, but is also destructive and aggravating to the workman who must operate the machine, in such a zone of high temperature.

The other type of machine in which the mold is filled by gravity is not open to the objections of the vacuum type machine. It is, however, a difficult matter to fill the molds with a molten glass, since this ordinarily requires arresting of the molds, while being filled, or other complicated mechanism to obviate such operation. Moreover, this requires considerable interruption of the flow of the glass stream, which can not be tolerated with a material like molten glass, which is liable to chill and form wrinkles and other defects in the finished article. In view of the fact that an automatic glass shaping machine for practical operation necessarily requires a traveling frame with a series of molds, all of which must necessarily be of heavy construction, it is impractical to operate such a traveling frame with a step by step movement, on account of the great inertia of such a heavy frame, which resists stopping and starting thereof. The speed of operation of such an intermittent machine is, therefore, very limited.

One of the objects of this invention, therefore, is to provide a method and machine, which will overcome the objectionable features of prior methods and machines.

Another object is to provide a method and machine whereby the molds may be filled from a stream of glass without interruption of the glass stream.

Another object is to provide a method of and operation for filling molds from a source of supply adapted to deliver a stream of glass, whereby successive molds may be filled without interruption of the glass stream.

Another object is to provide a method and apparatus for shaping a glass article, whereby a blank mold can be filled by a stream of glass and the blow hole formed by displacing action of the core, so as to forcibly shape the neck.

Another object is to provide a glass shaping machine, whereby the molds, mounted on a traveling carrier, may be successively filled from a source of supply without interruption of the source of supply, and without interrupting the movement of the traveling frame.

Another object is to provide a novel form of cut-off mechanism, which will cut a glass stream and retain the cut portion of the stream.

Another object is to provide a novel finishing mold and novel mechanism for operating the same, which is simple in construction and effective in its operation.

Another object is to provide a novel form of neck mold and operating mechanism therefor.

Another object is to provide a novel form of retainer for retaining the article when ejected.

Another object is to provide a novel form of ejecting mechanism, which is so coordinated with the blank mold as to prevent interference thereof.

Another object is to construct a glass shaping machine, in which the parts are maintained cool by the circulation of air.

Another object is to provide a novel form of furnace, which is adapted to deliver a stream of glass, and in which the temperature and fluidity of the stream can be accurately controlled.

Further objects will appear from the detailed description, taken in connection with the accompanying drawings, in which:

Figure 2 is a view similar to Figure 1, but showing the other side of the machine;

Figure 4 is a side elevation taken from the left, Figure 1, and showing two complete mechanisms;

Figure 5 is a view similar to Figure 4, but showing the molds, their carriers and a part of the traveling frame in section, the section being taken on the line 5—5, Figure 1;

Figure 6 is a detail showing the operation of the mechanism in elevating the molds;

Figure 7 is a detail of the bottle retainer shown in Figure 5;

Figure 10 is a section on the line 10—10, Figure 1;

Figure 11 is a detail of Figure 10, showing the mechanism in another position;

Figure 12 is a plan of the neck mold;

Figure 13 is a front elevation of the neck mold;

Figure 14 is a detail showing the connection between the blank mold and its actuating mechanism;

Figure 15 is a section on the line 15—15, Figure 1;

Figure 16 is an enlarged detail plan showing the cut-off mechanism;

Figure 17 is a section on the line 17—17, Figure 16;

Figure 18 is a section on the line 18—18, Figure 16;

Figure 19 is a detail showing the take-off mechanism;

Figure 20 is a cam diagram showing the relation of the mechanism;

Figure 21 is a diagram showing the movement of the parts;

Figure 30:
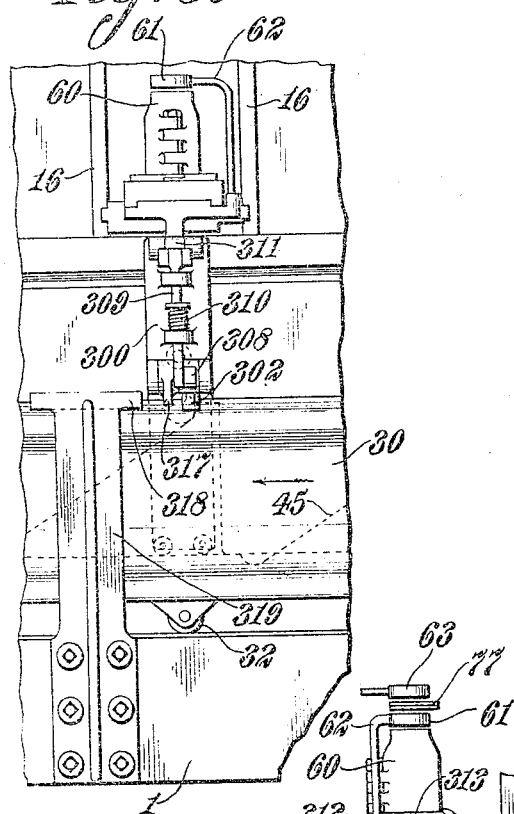
Figure 29:
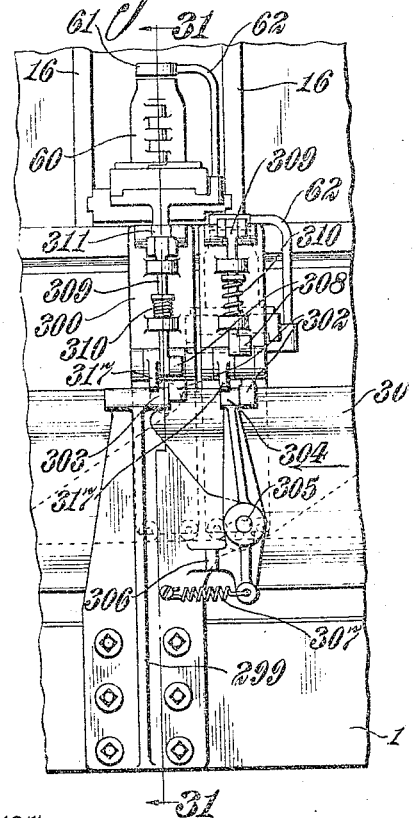
Figure 31:
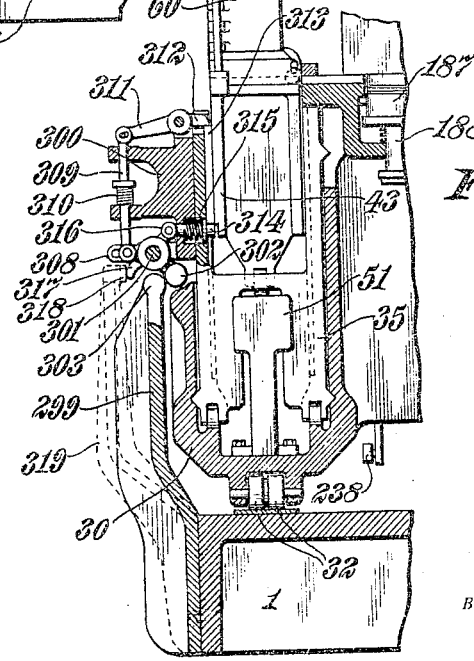

Figures 22 to 28 inclusive are longitudinal vertical sections illustrating the successive steps in the operation of the mechanism;

Figure 29 is a front elevation of a head and mechanism showing another embodiment of this invention;

Figure 30 is a view similar to Figure 29 but showing the mechanism in another position;

Figure 31 is a section on the line 31—31, Figure 29;

Figure 32 is a view similar to Figure 30, but showing another embodiment of this invention;

Figure 33 is a section on the line 33—33, Figure 32;

Figure 34 is a section on the line 34—34, Figure 33;

Figure 35 is a detail illustrating the gearing through a section on the line 35—35, Figure 33;

Figure 36 is a view similar to Figure 33, but illustrating another embodiment of this invention;

Figure 37 is a section on the line 37—37, Figure 36;

Figure 38 is a detail illustrating the operation of the mechanism, the section being taken on the line 38—38, Figure 37;

Figure 39 is a detail of a furnace and pouring means therefor adapted for use with the embodiment illustrated in Figures 36 to 38 inclusive;

Figure 40 is a cam diagram of the mechanism of the embodiment shown in Figures 36 to 39 inclusive;

Figure 41 is a vertical section through the furnace, showing the pouring mechanism embodying this invention;

Figure 42 is a section on the line 42—42, Figure 41; and

Figure 43 is a detail front elevation of a furnace, showing the method of control.

*The traveling frame.*

Referring to the accompanying drawings, and more particularly, to Figure 1 and Figure 2, 1 designates a base which is provided with wheels 2 mounted on a suitable track 3, so that the machine may be moved towards and from a suitable furnace or tank 4, which has a pour-out block 5 adapted to deliver a stream of glass to the blank molds as hereinafter described. Mounted on this base and fixed with relation thereto is a central hollow head 6 which has supported thereon and fixed thereto a head 7 adapted to support in fixed relation and stationary the operating cams and racks or segments as hereinafter described.

The base 1 is also provided with an annular track 8 for supporting the traveling frame. This traveling frame comprises an annular hollow body 9 provided with a base 10 having rolls 11 adapted to support the frame on the track 8, preferably through the medium of a hardened plate 12. The lateral bearing is provided by an axial projection 13 on the bracket 10 having a roller bearing 14 engaging the upper edge of the track 8. The traveling carrier is thus mounted for rotary movement on the base and may be thus rotated by a suitable motor (not shown) having a pinion or other mechanism (not shown) engaging gear teeth 15 on the bracket.

Figure 9:
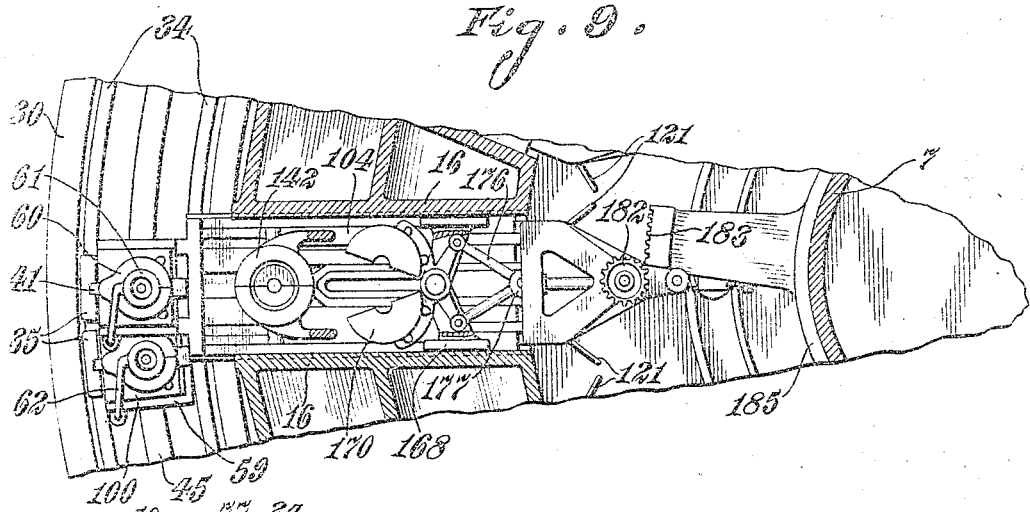
Figure 9 is a section on the line 9—9, Figure 1.
Figure 8:
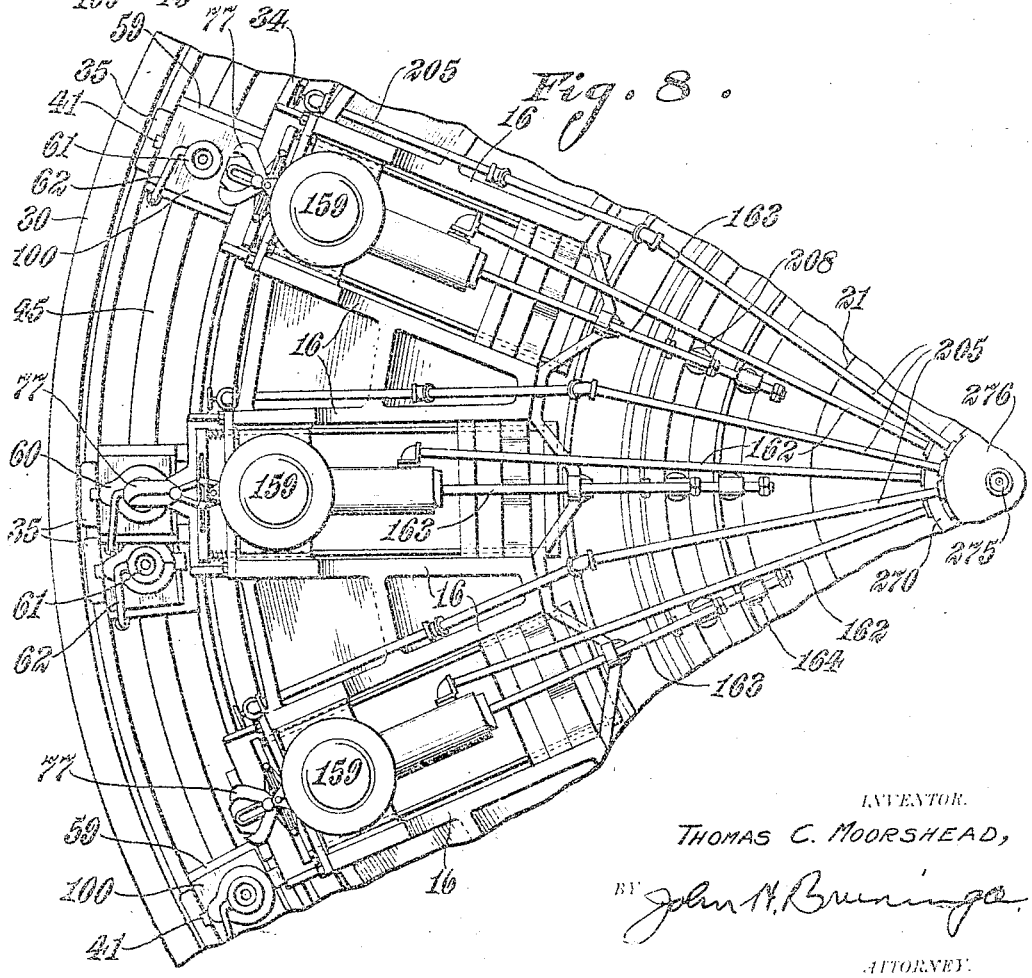
Figure 8 is a detail plan, showing three heads and their mechanisms.

Referring to Figures 1, 2, 4, 8 and 9, the traveling frame 9 has projecting upwardly therefrom and preferably cast integral therewith a series of spaced brackets 16; these brackets are cast hollow and suitably webbed as shown in Figures 8 and 9, so as to form box like structures. The interiors of these brackets open into the hollow body of the traveling frame. Moreover, the head 6 has an annular projection 17 extending into an annular recess in the traveling frame, and the head and the body 9 are provided with cooperating ports 18 and 19 so as to permit entrance of air through a supply pipe 20 through the hollow head 6 into the traveling frame and the interiors of the brackets 16 thereon for the purpose of cooling as hereinafter described.

The head 7 is provided with a suitable cover 21 and is also provided with openings 22 so as to permit access from the interior of this head to the various cams and mechanisms as hereinafter more fully described.

*The blank mold and its operating mechanism.*

Referring to Figures 1 to 8 inclusive and 15, attached to the traveling frame 9 is an annular support 30 provided with brackets 31 which may be cast integral therewith and bolted to or secured to the body 9 in any suitable manner. In order to additionally sustain this support in its movement with the body of the traveling frame, this support is provided with a series of rolls 32 bearing on the hardened plate 33 mounted on the base 1; the support is thus adapted to rotate with the body of the traveling frame and on the base 1. The support 30 is of U-section and has machined ledges 34 forming tracks. Mounted for movement along and in the support 30 are a series of carriages 35 one for each blank mold, and each carriage is provided with a series of rolls 36 engaging and moving on the tracks 34, while in order to additionally brace and sustain the carriage laterally, it is provided with ribs 37 engaging grooves in the side members of the support 30. A ring 38 is provided with brackets 39 bolted or otherwise secured to the body 9 of the traveling frame, and this ring is maintained in spaced relation with respect to the support 30. Each carriage 35 is provided at its upper end with a rib 40 engaging a similar groove in the ring 38. The carriages are, therefore, supported for movement circumferentially along the traveling frame and the support 30 and the ring 38 thereon.

Each carriage has mounted thereon a mold carrier 41 which is guided for vertical movements in the carrier by ribs 42 on flanges 43 on the carrier 41 engaging vertical grooves in the side members of the carriage. This permits free vertical movement of the carrier on its carriage.

The carriage 35 is constructed with spaced legs 44 adapted to embrace an inclined track 45 extending from one vertical block 46 to another vertical block 46, there being a series of these blocks supporting a series of tracks, bolted or otherwise secured in the bottom of the support 30. The bottom of the carrier 41 is provided with a roll 47 engaging the track 45, and it will be noted that this track is provided at its upper end with a flat 48 ending in a shoulder 49, and at its lower end with a depression to form a shoulder 50 for a roll. Each block 46 is also provided with a pair of laterally extending wings 51 adapted to engage the legs 44 of the carriage 35 in the elevated and depressed positions of the carriers respectively.

It will, therefore, be noted that the construction is such that a relative movement of the carrier with respect to and along the support 30 will cause the carrier to be elevated or depressed depending upon the direction of this relative movement, the carrier being elevated against the action of gravity, and depressed by gravity due to its weight.

Each carriage 35 has secured thereto a segmental rack 52, meshing with a gear 53 on the bracket 31 and provided at its upper end with a shaft 54 supported in bearings on the bracket 31, and provided at its lower end with a gear 55 adapted to mesh with racks 56 and 57 respectively mounted on the base, and positioned as hereinafter described. The construction is such (assuming that a carrier is in depressed position at the lower end of its incline 45) that when the traveling frame moves in the direction of the arrows, Figures 4, 5 and 6, the engagement of the gear 55 with the outer rack 56 will cause the carrier to move relative to the traveling frame in a direction opposite the direction of the movement of the frame, thereby causing the roll 47 on the carrier to travel upwardly along the incline 45 to elevate the carrier. The length of the rack 56 is such, that the carriage will be moved along the incline from one shoulder 50 to another shoulder 49, in other words, from the position occupied by the right carrier and carriage, Figure 5, to the position occupied by the left carrier and carriage. The gear is, however, so positioned that the backward movement relative to the traveling frame of the carrier will equal the movement forward of the traveling frame. Consequently, during such movement, the carriage will remain stationary in space, while the carrier will move up in a vertical but laterally stationary plane.

The rack 57 which is also mounted on the frame, operates to turn the gear 55 in the reverse direction when this gear comes into mesh therewith, and this rack also is of such length as to cause movement of the carriage and the carrier thereon from the shoulder 49 to the shoulder 50. Consequently upon further rotation of the traveling frame, the carrier which has been elevated, will again be depressed. It will be noted in this connection that the carriage is held in elevated position on the carrier, against one side of the wings 51, while it is positioned when the carrier is depressed by the other side of the wings. These wings, therefore, form positioning stops for positioning the carriage and the carrier thereon. In its depressed position, both the carriage and the carrier are held by gravity against the stop 51, while in elevated position, they are held against the stop 51 due to the inertia developed by the moving support 30. Moreover, the flat 48 may droop slightly to the right, as shown in Figure 5, so as to firmly but yieldingly hold the roll 47 against the shoulder 49 and the carriage against the stop 51.

Upon reference to Figures 1 to 4, it will be noted that the gear 53 for one carriage is slightly below the corresponding gear for the preceding carriage, and that the segmental racks 52 have the same relation. This is for the purpose of permitting the carriers to be moved close together by overlapping the racks. It will be noted that one rack is guided by the upper edge of the inner side member of the support 30, while the upper rack is guided by the lower edge of the ring 38. The guide faces may be dove-tailed so as to provide for rigid construction. It will be understood, of course, that the racks are securely bolted to their carriages.

Each carriage 41 is provided at its upper end with a head 58 supporting the base 59 of a mold 60. This mold is open at the top and closed at the bottom and is constructed as hereinafter described. Arranged above each mold and spaced slightly thereabove is a guide block 61 having a block arm 62 for supporting the same on the carrier 41. The furnace body is also provided with a guide block 63 sustained immediately below the pour opening in the block 5 of the furnace. The blocks 61 and 63 are provided with contracted openings so as to form funnel shaped guides for the stream of glass issuing through the pour opening in the block 5. In the operation of the machine as hereinafter described, the stream of glass flows continuously from the pour opening in the block 5, and this stream is guided by the block 63, and by the block 61 into the mold cavity 60 when that mold is positioned thereunder as hereinafter described.

*The cutting mechanism.*

Referring now to Figures 1, 2, 8, 16, 17 and 18, mounted on the brackets 16 is a bracket 70, having formed thereon an outwardly projecting flange 71, a leg 72, and side flanges or ribs 73. The flange 71 has formed therein an outwardly extending slot 74, in which slides a pivotal support 75. This support carries a pair of arms 76, the outer ends 77 of which are adapted to form a pair of cooperating shears or cutters, the cooperating edges being sharpened, while the outer edges are provided with downwardly extending flanges 78. The arms 76 are pivotally connected with arms 79, pivoted on the flange 71. The pivotal connections 80 between the arms 76 and 79 engage slots in a cross head 81 mounted on a pair of bars 82 sliding in the bracket 70, and in a cross piece 83 connecting the brackets 16 at their inner ends. The bars 82 are connected by a cross head 84, which is provided with a shank 85 having a cam roll engaging a cam 86 in a circular disc or cam carrier 87 fixed to the head 7. The bars 82 have mounted thereon springs 88, each of which bears at one end against the bracket 70, and at its other end against the cross head 81, so that these springs normally tend to move the cross head and the attached bars outwardly.

The cross head 81 is retained in normal position against the tension of its springs by means of a latch 89, pivoted on the bracket 70, and having its tail connected with a shank 90 sliding in bearing lugs on the bracket 70 and encircled by a spring 91 which normally retains the latch in engagement with the cross head 81. The inner end of the shank 90 is engaged by a cam 92 on the upper end of the arm 93 pivoted on the lug 72, and adapted to engage at its free end with a cam 94 on the furnace body 4. A turn buckle 95 may be provided to take up the wear, and to adjust the mechanism. A sprong 96, encircling the arm 93 and engaging the lug 72 and the arm, operates to maintain the same in normal position with a low point of the cam 92 in engagement with the shank 90, and a suitable stop may be provided to retain the arm 93 in this position.

In the normal position of the parts, the cutters are retained in retracted but opened position, as shown in Figure 16, and also Figure 8, (lowest position), by the engagement of latch 89 with the cross head 81. When, however, the arm 93 moves into engagement with the cam 94, it will operate to swing the arm, thereby causing the engagement of the cam 92 with the shank 90 to depress the shank, raise the latch 89, and thus release the cross head 81, which under the action of its springs 88 moves the cross head outwardly to dotted position, (Figure 16), thereby not only moving the cutters outwardly, but also closing them in overlapping relation as shown in Figure 16, (dotted lines), Figures 18 and 8, (central position). It will, of course, be understood that the cam 86 is sufficiently wide to permit such outward radial movement of the cam roll. Thereafter upon further movement of the traveling frame, an inwardly projecting part of the cam 86 will, by its engagement with the cam roll, move the bars 82 inwardly, so as to again retract the cross head 81 into engagement with the latch 89, thereby returning the parts to normal position, as shown in full lines, Figure 16.

Figure 1:
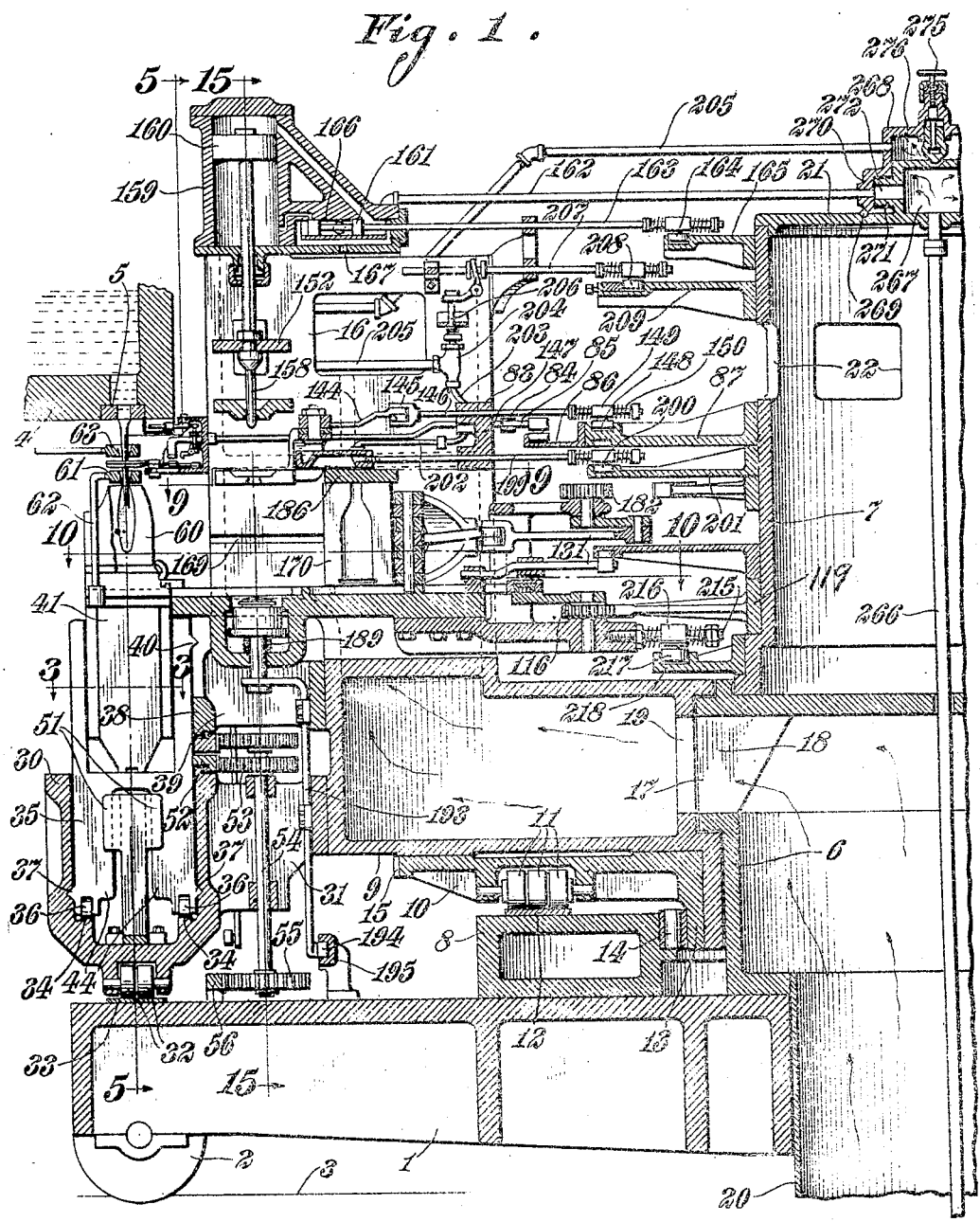
Figure 1 is a longitudinal vertical section through a part of the machine embodying this invention.
Figure 3:
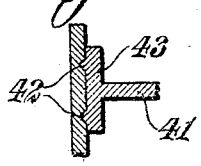
Figure 3 is a section on the line 3—3, Figure 1.

Upon reference to Figures 1 and 8, it will be seen that when the cutters move forwardly, they will move between the blocks 61 and 63 in the path of the glass stream, thereby cutting the glass stream and terminating its passage to the mold 60, being filled. As hereinafter described, as soon as the glass stream has been cut, the traveling carrier moves on carrying the mold and cutters with it, so that immediately after the cutting of the glass stream, the cutter will move out of the path of the glass stream and allow it to continue its flow downwardly, while the cut part of the glass stream below the cutters and flowing into the mold will move laterally with the mold and cutter. It will, of course, be understood that the movement of the traveling carrier, on account of its large diameter, is rapid; this would ordinarily cause the cut part of the glass stream to splash laterally; however, by the provision of the flanges 88 and the guide block 61, the cut part of the glass stream is retained laterally, so that it will flow down into the mold during the movement of the traveling frame.

*Operation in filling the molds.*

Assuming the parts to be in position shown in Figures 1, 4, 5, 22, and full lines, Figure 16, at this time, the elevated mold is in the path of the glass stream and is being filled by the downwardly flowing stream, while the cutters are still retracted but are just about ready to be tripped upon further slight movement of the traveling frame in the direction of the arrow, Figures 4 and 5. At this time, the carrier of the elevated mold is in such a position relative to the traveling frame that this mold is completely elevated with the roll 47 on the flat 48 and just about ready to engage the shoulder 49, while the legs 44 of the carriage are in a position to be engaged by the left face, (Figures 4 and 5) of a stop 51 on the traveling frame. It will also be noted that the succeeding mold is in completely depressed position, but closely adjacent the elevated mold, with the carrier roll 47 at the bottom of the incline 45 and in engagement with the shoulder 50, while the legs 44 of the carriage are in engagement with the right face (Figures 4 and 5) of a stop 51 mounted on the traveling frame.

Moreover, as seen in Figures 4, 5 and 6, the gear 55 of the succeeding carriage, the carrier of which is depressed, is in such a position as to engage the outer rack 56 mounted on the support 1, this engagement taking place when the carriage moves forwardly with the traveling frame, at the time that the center of the mold arrives directly below the glass stream.

Upon further movement of the traveling frame, the latch retaining the cutters will be released, thereby causing these cutters to quickly move outwardly and into engagement so as to cut the glass stream and terminate the supply of glass to the elevated mold. The mold and cutters now move onward to the left, (Figures 4 and 5) so that the elevated mold and the cutters move to the left out of the path of the glass stream, while the succeeding mold also moves to the left until it arrives directly below the glass stream. At this time, the gear 55 engages the rack 56, and the carriage of the depressed mold and carrier will now be moved backward relative to the traveling frame at the same speed as the traveling frame moves, so that the depressed mold will remain laterally stationary and in the path of the glass stream, while the gear 55 is in mesh with the rack 56. It will thus be seen that after a mold has been filled, the glass stream is cut, but since the cutters are released as the mold begins to move with the traveling frame and as the cutters move with the mold out of the stream path as soon as the stream is cut, the glass stream is not interrupted at all, since the lagging cutter will be in the stream path for only a small fraction of a second (in practice less than one-sixtieth of a second). The glass stream will, therefore, continue to flow down into the succeeding mold. The cutters do not, therefore, perform the function of supporting the stream as one mold moves into and the other out of the stream path, nor do they separate the stream into uniform molten masses, but they simply act to cut the stream to terminate the filling of one mold, while the stream continues always to uninterruptedly flow into the next mold, due to the fact that this mold is at a lower level and reaches the stream path at the time that the stream has dropped to this level. The cutters being only in the glass stream for a small fraction of a second, they do not become heated; nor is the glass chilled, so that the blank will not have the objectionable seam, as is the case with prior constructions.

The speed of rotation of the traveling frame and the distance of the block 61 on the succeeding mold below the point of cutting of the glass stream is so proportioned relative to the flow of the glass stream, that the succeeding depressed mold will arrive in the path of the glass stream before the glass stream reaches the level of the depressed mold 61, so that the mold is in position ready to receive the glass stream at the time that this glass stream has dropped to the level of the block 61. The mold, being now in the path of the glass stream, and the gear 55, being now in mesh with the outer rack 56, the mold will rise or elevate vertically in the path of the glass stream as the glass flows into the mold. The mold is thus filled while it is being elevated. As soon as the mold reaches its highest point, the traveling frame and the head carried thereby and supporting the cutters cooperating with the mold have caught up with the mold and have alined therewith, at which time the left face (Figures 4 and 5) of the stop 51 carried by the traveling frame will engage the right faces of the legs 44, and at which time, the mold will be fully elevated, the cutters will again be tripped to cut the glass stream, the mold being completely filled at this time. It will, of course, be understood that the succeeding mold, its carrier and carriage are now again in position similarly occupied by the mold whose operation has just been described, and the same cycle of operations will again be repeated.

Upon further movement of the traveling frame, the filled mold will be maintained elevated for a predetermined period for a purpose and as hereinafter described, and this mold will then again be depressed. This is accomplished by the engagement of the gear 55 with the inside rack 57, which causes the mold, its carrier and carriage to travel on at twice the speed of the traveling frame thereby causing the carriage to be advanced with respect to the traveling frame. This advance movement of the carriage causes the mold carrier to move downwardly to depressed position, until the legs 44 of the carriage again abut against the lagging faces of the stop 51 and until the roll 47 on the carrier reaches the shoulder 50.

*The blank mold shifting mechanism.*

Referring to Figures 1, 5, 10, 11, 14 and 22, the mold slide 59, which slides radially on the carrier head 58, has fixed thereto a base 100 upon which the mold is mounted. This mold and base comprise a pair of sections pivoted at 101 on the slide 59, and each section is provided with lugs 102, embraced by the wings of a latch 103 pivoted on the slide 59, so that when this latch is in engagement, it will operate to hold the mold sections in firm engagement to form the mold cavity. Mounted between the pair of brackets 16 and to slide radially is the carrier 104. This carrier is provided with guide grooves 105 adapted to receive the side ribs of the slide 59. When the blank mold carrier is in elevated position, the top face of the head 58 will be positioned on the level with the top face of the carrier 104, so that the mold slide 59 can now be moved radially inward and on the carrier 104. For this purpose, the carrier 104 has slidingly mounted thereon a pair of side bars 106, connected by a cross head 107 and provided with a pair of downwardly extending fingers 108, adapted to engage lugs 109 on the slide 59 when the mold carrier is in elevated position, so as to form a complete connection between the mold carrier slide 59 and the cross head 107. The side bars 106 are connected at their inner ends by a cross head 110 formed to receive a slide 111, which in turn has a slot 112 engaged by a cross pin 113 on the arm 114 fixed to the shaft 115, mounted for rotation in the carrier 104, and having also fixed thereto a pinion 116. This pinion is adapted to mesh with a pair of circumferentially spaced toothed-segments 117 and 118, (Figure 21) formed on the collar 119 fixed to the head 7. The carrier 104 is provided with a pair of outwardly extending lugs 120, which have secured thereto flaring guides 121.

After the blank mold has been filled as heretofore described and has moved out of the path of the stream of glass, at which time, the mold will be in elevated position with the mold slide in cooperating engagement with the cross head 107, the pinion 116 engages the first segment 117, thereby causing rotation of the shaft 115 through 180°, so that the blank mold will be moved from the position shown in Figure 22 to the position shown in Figure 23, so as to place the blank mold underneath the shaping mechanism to form the bottle neck, as hereinafter described. The blank mold will remain in this position until upon further movement of the traveling frame, the pinion 116 moves into engagement with the second segment 118. This causes the pinion to be moved through another 180°, thereby moving the blank mold back to position on its carrier.

In order to accurately position and lock the blank mold on its carrier 59, it is provided with a slot 122 into which projects the pivotal stop 101 connecting the blank mold sections, and the slot 122 terminates a short distance from the outer end of the head 59, so as to form a stop 123 as shown in Figure 22. It will be understood, of course, that the mold sections can be readily removed from the base 59, so as to permit of the substitution of molds of different sizes, the mold being retained in position by the dovetailed connection between the slide 59 and the head 58, and by the cooperating stops 101 and 123. The purpose of the slide 111 with its slot 112 is to permit complete movement of a long arm 114 with a short cross head 110, the slide 111 moving in the cross head, and the pin 113 moving in the slide during the movement of the arm 114. In order to insure complete return of the slide into the cross head, the guides 121 are provided, which operate by engagement with the rear ends of the slide 111 to return it to mid position.

Each mold section has a downwardly projecting pin 124 moving in a recess 125 in the head 59. When the mold sections are together to close the mold, these pins enter a recess 126 in the carrier 104, which recess is expanded at 127. The contracted end 126 of the recess has its side walls spaced apart a distance, equal to the distance between the outside faces of the pins 124. Consequently when the mold sections are together and latched by the latch 103, the pins 124 as well as the tail 128 of the latch 103 have entered recess 126 and also the part 127 of this recess. Sliding in suitable guide ways in the carrier 104, is a slide 129 having a wedge-shaped part 130 adapted to engage the tail 128 of the latch 103 and also the pins 124. This slide has a shank 131, guided in a bearing 132, connecting the lugs 120, and provided with a cam roll 133, engaging a cam in a cam plate 134, fixed to the head 7.

Upon movement of the traveling frame and after the mold is positioned as shown in Figure 23, at which time, the slide 129 is retracted and the mold sections closed and latched, the cam 134 operates to move the slide 129 outwardly, thereby causing the tip of the bevel end 130 to engage the tail 128 of the latch 103 and unlatch the mold sections, and cause the beveled sides to engage the pins 124; this will move the mold sections on their pivot 101 so as to open the mold, the expanded part 127 of the recess in the carrier permitting such movement of the pins 124. The mold sections now remain open even though upon further movement of the traveling frame, the slide 129 is returned to normal position. When, however, the mold is moved back outwardly, to normal position on to its carrier head 59 as heretofore described, the pins 124 in traveling from the expanded portion 127, to the contracted portion 126, and thereby engaging the inclined faces connecting these two portions, will cause the mold sections again to close, thereby engaging the lugs 102 and causing the latch 103 to drop thereover due to the weight of the tail 128 of the latch 103. The mold is, therefore, returned closed and latched to normal position on its carrier. It will, of course, be understood that the mold is retained in that position upon any depressing movement of its carrier, by the engagement of its right face (Figure 1) with a front face of the carrier 104, and the guide faces of the carriage 35, between which the mold travels with its carrier.

*The shaping mechanism.*

Referring to Figures 1, 4, 5, 8, 9, 12, 13, 15, 21, 23 and 24, mounted between the brackets 16 is the cross piece 140, which has pivotally mounted therein a pair of arms 141 having formed thereon downwardly extending members 142, recessed as shown at 143 to provide a pair of neck mold sections. The arms 141 are connected by links 144 with a head 145 on a shank 146 sliding in a cross piece 147, connecting the brackets 16. This shank has mounted thereon a cam roll engaging a cam groove 148 in the cam plate 87, which as heretofore described, is fixed to the head 7. The cam roll has a support 149 sliding on the shank, and is retained in normal position by springs 150 engaging collars threaded on the shank. There is thus provided an adjustable yielding connection between the cam and the neck mold sections. Consequently upon movement of the traveling carrier, the cam operates to yieldingly close and open the neck mold section, as hereinafter more fully described.

Mounted in guide ways 151 in the brackets 16 is a cross head 152 and connected with the cross head by bolts 153 is a follower 154, which is provided with a projection 155 adapted to enter a recess 156 in the neck mold 142. This projection 155 is recessed to complete the neck mold. The bolts 153 are fixed to the follower and pass loosely through the cross head 152, and interposed between the cross head and the follower are springs 157.

Passing through the follower is a core 158, which is clamped to the cross head by means of a collar and nut, as shown in Figure 1. This core forms a piston rod extending into a cylinder 159, having a piston 160 traveling therein, and provided with a suitable valve 161 for controlling the admission and the exhaust of compressed air or other motive fluid to and from the ends of the cylinder. The compressed air is supplied by a suitable pipe 162. The valve 161 has a valve rod 163, provided with a cam roll 164, controlled by a cam groove in the cam plate 165, fixed to the head 7. The connection between the cam roll and the valve rod is a yielding one and this yielding connection is constructed as heretofore described for the cam roll 148. The compressed air is admitted to the chest 166, and by the valve selectively to either end of the cylinder, while the exhaust takes place at the cylinder through an exhaust outlet 167.

When the blank mold is in the position shown in Figure 23, the cam roll 148 will upon movement of the traveling frame operate to close the neck mold sections 142 and the cam roll 164 will also be moved beyond the position shown in Figure 1, to cause the valve 161 to admit air to the upper end of the cylinder 159. This will force the piston 160 down causing the follower to freely move down on the neck mold, so that the projection 155 will enter the recess 156 to complete the neck mold, and thereafter the springs 157 will yield, thereby forcing the core 158 through the neck mold and into the blank mold. This will cause the glass to be forced upwardly into the neck mold cavity formed by the neck mold sections 142 and the projection 155 on the follower by the displacing action of the core, so as to form the neck of the article. It will thus be seen that the top of the complete mold comprising the blank mold, the neck mold sections and the follower forms a closed chamber into which the core is forced, so as to form the neck by a displacing action, operating to force the glass upwardly into the mold. It will also be noted that the top of the mold is closed by the yielding action of the springs 157. Accordingly, if a mold contains too much glass, the follower 154 will yield under the pressure of the rising glass thereagainst so that no breakage will take place.

Upon further movement of the traveling frame, the valve 161 will be shifted to connect the lower end of the cylinder with the compressed air and to connect the upper end of the cylinder with the exhaust, thereby causing the piston to rise carrying with it the core and the follower. On account of the provision of the springs 157, however, the core is first withdrawn from the mold, while the follower is still in place to clamp the mold, so that the core is firmly, but surely withdrawn. In the position of the parts, therefore, as shown in Figure 24, the core and follower will be completely withdrawn from the mold.

The finishing mold and bottom.

Referring now to Figures 1, 6, 10, 12, 21, 24, 25 and 26, mounted to slide on the carrier 104 are a pair of mold sections 170, adapted to form together the finishing mold. These mold sections are pivotally connected by a pin 171, which slides in a groove 172 on the carrier 104. These mold sections are also provided with pins 173 engaging slots or ways 174, which extend parallel for some distance and then curve inwardly, as shown at 175 on axes having the pin 171 as a center. The mold sections are connected by links 176 with a head 177 on the link 178, connected to an arm 179 fixed to a shaft 180 in a cross piece 181 on the lugs 120, which, as heretofore described, are fixed to the carrier 104. The shaft 180 has fixed thereto a gear 182 adapted to mesh with segments 183 and 184, spaced circumferentially and fixed to a collar 185, which is in turn fixed to the head 7. A cross piece 186 connecting the brackets 16 serves to guide the upper faces of the mold.

The carrier 104 has sliding vertically therein a mold bottom 187, fixed to a shank 188 and encircled by a spring 189, which normally serves to move the bottom up; this movement being limited by a collar 190. The shank 188 is provided with a collar 191 engaged by a fork 192 on a shank 193, sliding in bearings on one of the blocks 31 and provided at its lower end with a cam roll 194 engaging a cam 195 supported on the base 1. The bottom 187 has a suitable rib 196 adapted to engage a corresponding recess 197 in the mold section.

Upon movement of the traveling frame, the engagement of the pinion 182 with the segment 183 will cause the shaft 180 and the arm 179 thereon, to be moved through 180 degrees. This will move the finishing mold sections from the position shown in Figure 24 to the position shown in Figure 25, thereby moving these mold sections forwardly. During this movement, but prior to its termination, the cam 195 will have acted on the cam roll 194 so as to permit the spring 189 to move the mold bottom 187 up as shown in Figure 24. As the mold sections now move forwardly, they will first move for time distance, while separated on account of the pins 193 engaging the straight grooves 174; but as soon as the pins reach the inwardly curved portions 175, at which time the pin 171 will have reached the outer end of the groove 172, the mold sections will move inwardly under the pressure of the links 176 on the mold sections, tending to rotate them inwardly, about the pin 171 as an axis, the pin moving in the arcuate grooves 175, until the mold sections engage one another to close the mold. Consequently the mold sections will move outwardly and the outward movement will then stop while the mold sections swing towards one another to close the mold and enclosing the mold bottom. Upon further movement of the traveling frame, the mold sections will be returned by the engagement of the pinion 182 with the segmental rack 184.

The blowing mechanism.

Arranged to move over the neck mold sections 142 is a blow head 198, which is guided between the arms of the neck mold, as shown in Figure 13, and is also guided by the cross piece 186. This blow head has a shank 199 guided in the cross head 147 and provided with a cam roll 200 engaging a cam in a cam disc 201, fixed to the head 7. The air under low pressure is supplied to the blow head by a tube 202, connected by a flexible tube 203 with a valve casing 204, which receives air under low pressure from a suitable pipe 205. The valve casing 204 is provided with a suitable valve closed by a spring as shown in Figure 1, and having a valve stem 206 operated by a rod 207 guided in one of the cross pieces supporting the brackets 16, and provided with a cam roll 208, engaging a cam groove in a cam disc 209, fixed to the head 7. The neck mold arms are provided with lugs 210, which operate to guide and hold the blow head down on the neck mold.

Immediately after the core has moved out of the blank mold, and while the follower rises from the neck mold, the blow head is moved over the neck mold and between the arms thereof, the blank mold being at this time still in place and closed. The cam 209 now acts on the cam roll 208 to open the valve in the casing 204, thereby admitting air, at low pressure, to the blow head. This air is admitted for a short period only, and its purpose is to slightly compress the blank and chill it in the blank mold. The air is now cut off by a depression in the cam 209. The blank mold is now moved back on its carrier, thereby leaving the blank suspended by the neck mold as shown in Figure 24, and the mold bottom 187 also rises at this time, while the finishing mold sections move into position as shown in Figure 25, to enclose the mold bottom and rest directly under and in alinement with the neck mold, and so as to also enclose the blank suspended in the neck mold. Air is now again admitted to the blow head, so as to blow the article to finished form, as shown in Figure 26, air being admitted for a period sufficient to blow the article and being thereafter cut off. The article will now be completely blown in the body mold. The blow head will now be again retracted, as shown in Figure 27.

The ejecting mechanism.

Referring now to Figures 1, 2, 4, 5, 7, 8, 9, 15, 21, 27 and 28, the carrier 104 has fixed to its inner end a shank 215, on which slides a sleeve 216, retained by springs 219 and carrying a cam roll 217 engaging a cam groove in a cam disc 218, fixed to the head 7. The ring 38 has a recess 220 for a hollow boss 221 on the carrier. During the movement of the traveling frame, the cam 218 operates to reciprocate the carrier 104, and move it from full to dotted line position, Figure 2, carrying the slides 106 and 129, and also the finishing mold sections 170 and the mold bottom 187 with it. The gears 116 and 182 can, of course, move freely with the carrier, but in order to permit the slide 129 to move with the carrier, the cam 134 must be extended, as shown in dotted lines, Figure 2, to correspond to the extension of the cam 218, as shown in dotted lines, Figure 2, the cam paths and the cams 134 and 218 cooperating in the direction and amplitude to accomplish this result. The provision of the fork 192, of course, permits the shank 188 to pass out of engagement with the same, and again into engagement therewith when the carrier is returned. All of this takes place after the traveling frame has passed the position of the parts, shown in Figure 2. Accordingly, after the blank has been blown to form the complete article, as shown in Figure 26, the blow head is returned to normal position, as shown in Figure 27, the cam 87 operates to open the neck mold sections, and the carrier 104 with the finishing mold still closed is moved forwardly to dotted position, Figure 1, and to the position shown in Figure 27, thereby placing the article in the path normally occupied by the blank mold. It will, of course, be understood that at this time that the blank mold and its carrier have dropped and moved to one side as shown in the right position, (Figures 4 and 5), so as to permit such outward movement of the carrier. The pinion 182 now moves into mesh with the segment 184, thereby separating the finishing mold sections and returning them to normal position on the carrier, as shown in Figure 28, thereby completely freeing the finished article and permitting removal thereof as hereinafter described.

The retaining mechanism.

Referring to Figures 1, 2, 4, 5, 7, and 28, mounted on each bracket 16 is a bearing bracket 230 having sliding therein a head 231, carrying a shank 232 provided with an arm 233 having a cap 234, adapted to engage the article. The head 231 slides vertically in the bracket 230 and is provided with a lug 235 engaging a cam 236 in the bracket. A shank 237 slides vertically in the bracket and has at its lower end a cam roll 238 engaging a cam 239 on the base 1. This shank has a collar 240 connected with the head 231, as to cause the head to move with the shank and permit rotation thereon, and the shank, furthermore, has a splined connection with the bearing bracket 230, so as to prevent rotation thereof. A spring 241 operates to normally retain the head in elevated position. The construction is, therefore, such that movement of the traveling frame will cause the cam 239 to reciprocate the shank 237 vertically, thereby causing reciprocation and rotation of the arm 233 and the cap 234 carried thereby, so as to move the cap down on the neck of the article, as shown in Figure 2, when this article is moved outwardly with the carrier 104 as heretofore described.

The take-off mechanism.

Referring now more particularly to Figures 19, 21 and 28, mounted on the base 1 is a shaft 245, and mounted on roller bearings 246 on the base is a carrier comprising a lower plate 247 and an upper plate 248 connected by columns 249, and the lower plate 247 is provided with gear teeth 250, so that the carrier may be rotated in timed rotation with the traveling frame through any suitable intermediate mechanism. The upper plate 248 is provided with a series of posts 251, upon each of which is pivoted a pair of bell crank levers 252, each provided with a jaw 253, and each connected by a link 254 with a head 255, having a shank 256, connected with a block 257, moving in guide ways 258, on a plate 248. Each of these blocks is provided with a cam roll 259, engaging a cam groove in a stationary cam 260, fixed to the shaft 245. The connection between the shank 256 and the block 257 is a yielding one through a spring 261 in the manner heretofore described, so that the jaws 253 will be yieldingly closed and positively opened. A cam groove in a cam 260 is formed as shown in Figure 21, so that the jaws will be opened and closed at predetermined points in the movement of the carrier.

Upon movement of the traveling frame and upon movement of the carrier 247—248, the jaws will close upon the article (held by the retainer 234, and the mold bottom 187 on the carrier 104, which has been moved forwardly) after the finishing mold has been retracted, as shown in Figure 28, and the article is then taken off by the jaws 253 and carried around to a position where these jaws are again opened, when this article is discharged upon any suitable conveyor to permit the article to be placed in the lehrs for the purpose of annealing.

Air cooling and supply system.

Referring to Figures 1, 2, 8 and 15, a blower supplies air to the pipe 20, and this air is supplied to head 6, whereupon it is passed through the ports 18 and 19 into the body 9 of the traveling frame. This air is now forced upwardly into the hollow brackets 16, and issues through nozzles 265, positioned opposite the blank mold and the neck mold as shown in Figure 15. The circulating air does, therefore, not only keep the interior of the traveling frame body cool, but by issuing opposite the blank and neck molds, cools the same and also cools the finishing mold when that mold is opposite the neck mold. The result is, therefore, that the entire mechanism is maintained cool and the parts are, therefore, prevented from binding and lubrication of the mechanism is facilitated.

A compressed air pipe 266 rises vertically through the head 7 and discharges into a chest 267, which is stationary on the cover 21 of the head 7, and which is supported by a traveling head 268 resting on roller bearings 269 on the cap 21, and the pipes 162 open from the lower part 270 of the head 268. The chest 267 is provided with a flange 271, which is apertured as shown at 272 to discharge the air from the chest 267 into the pipes 162, in order to deliver air at the high pressure to the cylinders 159. The head 268 therefore, rotates with the pipes 162 and the traveling frame, on the cap 21.

The top of the chest 267 has an aperture, 273 conical in form, which is controlled by a needle valve 274, which is mounted in the top of the head 268, and is manipulated by a hand wheel 275. There is thus formed a second chest 276 in the head into which open the pipes 205, which supply the air to the blow heads. The valve 274 operates to reduce the pressure to an amount sufficient to furnish the air to the blow heads at the proper low pressure.

Summary of operations.

Referring to Figures 1, 2, 5, and 20 to 28 inclusive and starting with the depressed mold, shown to the left (Figure 5) whose position, together with its cooperating head, carrying the carrier, the shaping and blowing mechanisms, and the finishing mold shown to the right in Figure 5, has been indicated by the position A in the diagram (Figure 19) and assuming the traveling frame to rotate in the direction of the arrow (Figure 21), the operations may be generally summarized as follows:

As the stream of glass entering the elevated mold is cut, which takes place the instant that this mold begins to move onward, the adjacently positioned depressed mold will be carried onward towards the pour-out point located on the line P (Figure 21) so that the elevated mold will be moved out of the path of the glass stream, and the depressed mold will be moved into the path of the stream. As the glass stream is thus severed by the cutters, which move with the elevated mold and its cooperating head, and which separate the cut part of the stream flowing into the mold from the part flowing from the glass tank, the flow of the glass stream is not interrupted but continues, the mold, its guide block and its carrier moving out of the path of the stream faster than the stream can drop, so that no interference can take place. The glass stream will thus drop while the depressed mold is moving from position A to position B into the path of the descending stream; the distance from the point of cutting of the glass stream to the mouth of the depressed mold, the speed of movement of the traveling frame, the distance from position A to position B and the timing of the cutters are, however, so relatively proportioned that the depressed mold will arrive in the path of the glass stream before the stream reaches the opening to the mold, or rather the guide block positioned over the mold. The mold now remains stationary while the corresponding head moves from position A to position B.

and during this movement of the head with the traveling frame, the mold is always in the path of the glass stream now entering the mold. As the head catches up with the mold and moves into alinement therewith as shown by position B (Figures 20, 21, and 22), the mold has reached its highest position as shown in Figure 22, such highest position corresponding to the position of the left mold, (Figure 5). The flow of the glass stream is so proportioned that the mold will have been filled with the proper amount of glass, sufficient to form the article desired, at the time that the head reaches the position B, opposite and in alinement with the mold. The cutters will now be released and will move axially into the path of the glass stream to cut the same and terminate the flow of glass to the mold being filled, and the mold will at this instant move out of the stream path, while the cut portion flowing into the mold will be carried with it, leaving the stream issuing from the glass tank free, to continue in its downward flow.

The mold moving inward with the traveling frame, which has now caught up with it, being now on a level with the carrier 104, the gear 166 will move into mesh with a rack 117 so as to move the filled mold underneath the neck mold, this movement taking place while the traveling frame moves from the position B to position C, (Figures 20, 21, 22 and 23). Compressed air is now admitted to the cylinder 159, thereby depressing the core 158 and the follower 154, so as to move the follower on to the neck mold to complete the neck cavity, and so as to force the core into the mold, thereby causing the glass to be forced upwardly into the neck mold cavity, formed by the neck mold and the follower, to shape the neck and form the opening. The core and the follower are now withdrawn and elevated by the admission of air to the lower side of the piston in the cylinder 159, thereby leaving the shaped blank with the neck formed and shaped and a blow hole formed therein, in the neck mold and in the blank mold. The blow head now moves into position over the neck mold, and air is admitted to compress and chill the blank while still in the blank mold. This shaping of the neck, the formation of the blow hole and the compressing and chilling of the blank in the blank mold takes place while the traveling frame moves from the position C to position D (Figures 20, 21, 23 and 24).

During the onward movement of the traveling frame from position D to position E, (Figures 20, 21, 24 and 25), the blank mold is first unlatched, then opened by the cam slide 129 and is then moved outward on the carrier 104 and onto its carrier 41, this movement taking place by meshing of the gear 116 with the segment 118, as heretofore described, the blank mold automatically closing as it moves outward on the carrier 104. During this movement of the blank mold, the mold bottom is also elevated by the cam 195 and the actuating spring. This leaves the blank suspended by the neck mold. The gear 182 now meshes with the segment 183, whereby the finishing mold is moved outwardly to a position underneath neck mold, ready to close on the blank.

While the traveling frame moves onward from position E to position F, (Figures 20, 21, 25 and 26), the finishing mold is completely closed around the blank and around the raised bottom as shown in Figure 25. Air under low pressure is then again admitted to the blow head to blow the blank to form, as shown in Figure 26. During this movement of the traveling frame from position E to position F, the blank mold, which is now on its carrier, is advanced with respect to the traveling frame by engagement of the gear 55 with the inner rack 57, which is positioned between positions E and F, and the blank mold will be depressed during such movement.

While the traveling frame moves from position F to position G, (Figures 20, 21 and 26), the blowing of the article is completed and the air pressure is cut-off at any suitable point in the travel of the frame between positions F and G, but is preferably continued until the mold reaches position G. The blow head is also retracted at any suitable point between positions F and G, depending upon conditions and the character of the material used. Accordingly, when the traveling frame arrives at the position G, the blowing of the article will have been completed, and it is ready to be ejected.

While the traveling frame moves from position G to position H (Figures 20, 21 and 28), the neck mold is opened, but thereafter the carrier 104 moves outwardly carrying the finishing mold, its bottom and the article in the finishing mold, with it to dotted position shown in Figure 2 and to the position shown in Figure 27, the gear 182 being disengaged at this time, and the cam 134 being extended as heretofore described to permit such operation. Now it will be noted that the blank mold at this time is in a depressed position, and laterally of the carrier 104 and the finishing mold 134 thereon, so that the parts thereon can move outwardly. During the latter part of the movement of the traveling frame from position G to H, the gear 182 moves into mesh with the segment 184, so as to open the finishing mold and expose the article. During the latter part of this movement, the retainer 234 is also moved down on to the neck of the article, holding it on the mold bottom. The article will, therefore, be exposed and held in position to be ejected when the traveling frame arrives at the position H.

As the traveling frame moves from position H to position I, the finishing mold will be retracted, while the carrier 104 remains stationary. Concurrently, the take off arms or jaws 253 will close on the article, and after these jaws have thus closed, the retainer 234 will be moved back to normal position, thereby permitting the jaws to take off the article. Thus the article will now be held by the take off mechanism until the jaws 253 arrive at the position J at which time they will automatically open and discharge the finished article onto a suitable conveyor.

As the traveling frame moves from position I to position A, the carrier 104 is retracted, and the gear 182 being out of mesh with segment 184, this return movement is permitted, while the cam 134 again follows the cam 218 to permit the slide 129 to remain in its normal position on the carrier. This completes the cycle of operations.

In the description describing the operation of the machine, only one machine head and mold have been specifically described, but it will be understood that there are a series of these molds and heads, carrying the shaping and blowing mechanism and finishing mold, arranged circumferentially on the traveling frame. The operation of such mechanism is, however, the same and they follow one another in the same cycle of operation as heretofore described. In view of the fact that the mechanisms follow one another in position and operation, and pass through the same cycle of operations and successively engage the same cams and segments, further description of the construction and operation is, therefore, unnecessary.

*The embodiment of Figures 29 to 31 inclusive.*

Figures 29 to 31 inclusive show another embodiment of this invention, and more particularly, the mechanism for elevating, depressing, advancing and retarding the blank molds. In this embodiment, the support 30, the carriages moving therein, the mold carriers moving vertically in the carriages, the inclines and the stops, are substantially of the same construction as shown in the preceding form, except that the flat 48 at the upper end of the incline 45 (Figure 5) is omitted, so that the incline extends from the shoulder 49 to the shoulder 50.

Referring now to Figures 29 to 31 inclusive, each carriage has mounted thereon a bracket 300 supporting a short shaft 301. Loosely mounted on this shaft is a stop 302, which is adapted to engage with a fixed stop 303, formed on the bracket 299 mounted on the base 1, and with a yielding buffer 304 pivoted at 305 on the bracket 299 and retained in normal position against the lug 306 on the bracket 299 by a spring 307. The stop 302 is provided with an arm 308 engaged by a bar 309, sliding vertically in bearings in the bracket 300 and maintained in raised position by a spring 310. This bar connects with an arm 311, pivoted at the bracket 300, and provided with a toe 312, adapted to be engaged by a shoulder formed on the upper end of a rib 313 on a carrier flange 43.

A plunger or latch 314 sliding in the bracket is held in engagement with a shoulder formed by the lower end of the rib 313 by means of a spring 315. This plunger is connected with an arm 316 loosely mounted on the shaft 301, and having a finger 317 arranged in the path of a cam 318, formed at the upper end of a bracket 319 positioned on the frame 1 at about the point E (Figure 21).

Assuming the carrier to be at the lower end of the incline, so as to be arrested by the stop 51, as the traveling frame moves in the direction of the arrows (Figures 29 and 30), the stop 303 will engage the stop 304, thereby braking the movement of the carrier in the direction of the arrows. On account of the inertia of the carriage, tending to move with the traveling frame, the spring 307 will yield and the stop 304 will, therefore, move to the left (Figure 30) until it drops below the level of the stop 303, when this stop will move out of engagement with the yielding stop 304, and will be arrested positively by the stop 301, fixed to the base, so as to position the carriage, the carrier thereon and the mold on the carrier, with the mold cavity in the path of the stream of glass. It will be understood that during this movement, the carrier will be slightly raised on the incline 45, but will drop back again as the stop 302 moves into engagement with the fixed stop 303. The mold will thus be positioned in the stream path in depressed position, and since the preceding mold has moved out of the stream path when in elevated position and the stream cut, the stream from the tank will drop to the level of the depressed mold being moved into the stream path, while the mold thus moves. When, therefore, the stream reaches the mold, this mold will be positioned in the stream path, and will be retained in that position by the cooperation of the stops 302 and 303.

As the traveling frame now moves on, the incline 45 will elevate the mold, while it is being filled, until this mold reaches its highest point, at which time, the cutters operate to cut the stream in a manner, heretofore described in the operation of the first embodiment of this invention. When the mold reaches its highest position, the rib 313 on the mold carrier will engage the toe 312, thereby moving the stop 303 to the position shown in Figure 31; concurrently however, the plunger or latch 314, which has been bearing against the rib 313, will take under the rib and latch the carrier in raised position. At this time, the stop 51 will have reached the lagging face of the carriage.

At the time, therefore, that the mold reaches its highest position, the cutters will have been released to cut the glass stream, the carrier will have been latched in raised position, the stop 302 will have been moved out of the path of the stop 303, and the stop 51 will be in engagement with the carriage ready to move it onward. Upon further movement of the traveling frame, therefore, the elevated mold will be carried with it and the next mold and carriage, which at this time are adjacent the elevated mold, and ready to go through the same cycle of operations, will be moved into the stream path. The blank mold is now in a position to be moved under the neck mold, going through the same operations from position B to position E. (Figure 21) as in the preceding embodiment. As the traveling frame moves from position E to position F, the finger 317 will engage the cam 318, so as to retract the latch 314, thereby releasing the carrier and permit the mold to travel down the incline 45 by gravity until the carriage is again arrested by the stop 51. This mold is now again in position to be filled, as heretofore described.

It will be noted that the other mechanisms are constructed as in the preceding embodiment, and that the cycles of operations of the other mechanisms are the same. Further description will, therefore, be unnecessary.

*The embodiment of Figures 32 to 35 inclusive.*

In this embodiment, the carriage 35 moves in the annular support 30 of the traveling frame, as heretofore described, and its carriages are advanced and retarded through the gear and rack connections as in the first embodiment of this invention, heretofore described. The carriers 41 also slide vertically in the carriages, and the molds are mounted on these carriers in the same manner as heretofore described. The elevating mechanism, however, is through the medium of screws instead of inclines.

Each carrier 41 has a cross piece 325 at its lower end and the web is cut away, as shown at 326. A cross piece 325 is threaded to receive a screw 327, which has a thrust bearing in the base 328 of the carriage. This screw has fixed thereto a pinion 329 meshing with an idler 330 mounted on the base 328, and this idler in turn moves with an internal gear 331, loosely mounted on the extension of the screw 327. The gear 331 has fixed to it the pinion 332, which meshes with a rack 333, fixed to the support 34, this rack extending continuously around the support. The sides of the support may also be connected by cross pieces 334. It will be understood, of course, that there are racks 56 and 57, mounted on the base 1 and spaced as in the first embodiment of this invention, heretofore described.

Assuming the molds to be positioned as shown in Figures 32 to 35 inclusive, with one mold elevated and the succeeding mold depressed, but adjacent to it, and assuming that the elevated mold has been filled and the cutters are ready to be released to cut the stream, as the elevated mold moves on with the traveling frame, the depressed mold will move into the stream path while still depressed. As the depressed mold reaches the stream path, its controlling gear 55 will engage the rack 56, thereby moving the carriage backward relative to the traveling frame and its carriage will remain laterally stationary and in the stream path. This causes the pinion 332 and the rack 333 to move relatively, thereby rotating the screw 327 and elevating the carrier while in the stream path. When the mold reaches its highest position, at which time the head carrying the other mechanism has caught up with it and will be in alinement therewith, the cutters will be released, thereby cutting the stream path, and concurrently the controlling gear 55 will move out of the mesh with the rack 56. At this time, the cross piece 334 will also engage the carriage, so that the carriage will travel onward with a traveling frame, moving the mold out of the stream path, and moving the succeeding mold into position in the stream path.

The mold being now elevated, is moved into the carrier 104, and the operations will be as in the first embodiment. Between positions E and F (Figure 21), the rack 57 will be engaged by the gear 55 and the mold will be depressed and again advanced with respect to the traveling frame. The cycle of operations will then be completed.

*The embodiment of Figures 36 to 40 inclusive.*

In this embodiment, the molds are not elevated, but are simply advanced and retarded with respect to the traveling frame. The molds are, therefore, moved into the stream path at the same level that they leave this path. This requires that the flow of the glass be interrupted or otherwise controlled, while one mold is passing out of the stream path and the other into the stream path.

Referring to Figures 36 to 40 inclusive, the traveling frame, the support 30 thereon, the carriages 35 and the gear and segment connections thereto are of substantially the same construction as in the first embodiment. In this embodiment, however, the molds are mounted directly on the carriages and these molds are held in elevated position, but advanced and retarded with the carriages. The base of the support 30 has mounted thereon a stop 340, which performs substantially the same functions as the stop 51 in the first embodiment.

Mounted on a stationary bracket 341 which also supports the block 63, is a tilting pot 342, this pot being pivoted at 343 forwardly, (to the right Figure 37) of its center of gravity so as to remain normally in a position with the spout 344 thereof raised, this spout being directly opposite the block 63, so that when the pot is moved to the position shown in Figure 39, the glass will flow through the block 63 and into the mold. The pot receives a constant stream of glass from a pour out block, such as 5, in the other embodiment, which delivers a predetermined stream of glass to the pot. and this pot may be covered by a hood 345, so as to maintain the glass in the pot heated. The rear end of the pot is connected by a link 346 with an arm 347 on the bracket 341, having a cam roll 348 adapted to engage with a series of cams 349 on a ring 350 mounted on the support 30, it being understood that there is a cam 349 opposite each head, so that as each head moves into position, the cam operates to tilt the pot in order to pour a predetermined amount of glass, the pot being then returned by gravity as the roll 348 leaves its cam 349. The cutters 77 are mounted on each head on the traveling frame as in the first embodiment described, except that they are positioned higher to cut the glass stream, issuing from the spout close to the end of the spout.

The cycle of operations is shown in the cam diagram (Figure 40). Assuming the left mold (Figure 36) being filled at which time, the cam roll 348 is on a high part of the cam 349, thereby causing the pot to be tilted to pour the glass into the mold, (the mold and its carriage being stationary at this time on account of the compensating rack and gear connections, as heretofore described) as the stop 340 reaches the left mold carriage, the gear 55 will leave the rack 56 and the mold will now move onward with the traveling frame. Just prior to the movement of the mold carriers out of the path of the stream of glass, the cam roll 348 moves to the low part of the cam 349 and the pot is now shifted back by gravity, thereby interrupting the flow of glass to the mold. At this time the cutters are also released to cut the glass stream close to the spout, permitting the cut part to flow into the mold and past the block 63. This cutting prevents the viscous glass stream from stringing out and catching in the block 63, when the mold is moved onward, while the glass is cut off close enough to the spout of the pot, so that when this pot is tilted back, the residue will not string out sufficient to reach the next mold block 63 before it is moved into position. The succeeding mold is now moved into position and as it arrives underneath the block 63, its controlling gear 55 moves into mesh with the rack 56 so that this mold will now be held stationary underneath the block 63. At about the time that the mold is positioned underneath the block 63, the cam roll 348 will move on the high part of the next cam 349, thereby tilting the pot and causing the glass to flow into the mold. After the mold has been filled, it will again be moved forwardly so that the flow of glass is again interrupted by tilting of the pot, and this mold will be now moved onto the carrier 104, and the same cycle of operations will take place as in the first embodiment. The mold carriage is now again advanced on the traveling frame and the same cycle of operations again repeated. It will be noted that in this embodiment, the flow of glass is interrupted by shifting the tilting pot, but the flow of glass to the tilting pot is in a constant stream of constant cross section, and is governed by the orifice in the block 5. The flow of the glass to the mold, can, therefore, be accurately controlled, so that a predetermined amount of glass will always be measured into the mold.

*The glass tank or holder.*

Referring to Figures 41, 42, and 43, 360 designates a tank or holder, adapted to receive a mass of molten glass, this tank or holder comprising a structure provided with a partition 361, dividing the tank or holder into a melting chamber 362 and a refining chamber 363. The melting chamber is provided with a suitable material inlet and with openings for gas for heating the same, and is otherwise constructed in any manner well known to those skilled in the art. The tank or holder is, of course, constructed of any suitable refractory material.

Attached to the front of the tank is a head 4, which, as heretofore described, is provided with a block 5, forming an orifice for delivering the stream of glass to the guide block 63 and hence to the molds, as heretofore described. This head is also constructed of a suitable refractory material. Arranged in the head is a gate valve 364, connected by a cable 365 with a screw 366 engaged by the threaded hub of a hand wheel 367 mounted on a bracket 368 on the body of the tank. By manipulation of the hand wheel 367, the gate valve 364 can be raised and lowered, this valve dropping by gravity to cut off the supply of glass from the tank to the block 5 and the orifice therein. There is thus delivered from the refining chamber, a stream of glass which flows into the molds to fill the same, as heretofore described.

Movable through a slot in the top of the head 4 is a controlling element 369, which is adapted to dip into the mass of glass in the refining chamber. This element is connected by a cable 370, passing over pulleys 371 on the tank body to a screw 372, engaged by a threaded hub of a hand wheel 373, mounted on a bracket 374 on the tank body. It will be understood that this element, as well as the gate-valve 364 are constructed of a refractory material. By manipulation of the hand wheel 373, the controlling element 369 can be raised or lowered to vary the extent of the dip of this element into the mass of glass in the refining chamber.

It will, therefore, be noted by reference to Figure 41, that the glass is drawn from below the level of the mass in the refining chamber and delivered to the outlet or orifice in the block 5. In view of the fact that the character, that is, the fluidity of the glass, varies with the depth in the mass (the glass at the surface, which is subjected to the heating gases, being hottest and, therefore, most fluid, and the fluidity decreasing directly as the glass level) the character of the outlet glass withdrawn and delivered to the outlet can be varied by adjustment of the element and the extent of its dip. In accordance with this invention, therefore, the character of the delivered glass is varied by varying the level in the mass at and from which the glass is withdrawn. By controlling the extent of the dip of the element, glass of any desired character and fluidity can be delivered to the outlet. In view of the fact that the glass stream delivered by the outlet varies with the diameter of the opening of the outlet, and with the fluidity of the glass, the quantity of glass delivered by the orifice of a given diameter during a certain period, can be varied in accordance with its fluidity and can, therefore, be varied by the adjustment of the element 369. The quantity of glass delivered can, therefore, be accurately controlled and measured. Moreover, this quantity can also be controlled by the substitution of different blocks 5 having different sized orifices.

Conclusion.

It will, therefore, be seen that the invention accomplishes its objects. The machine is entirely automatic in its action and in view of the fact that the glass is delivered in a continuous stream with interruption in the flow of the glass, the glass will not become chilled at any point, with a result that all wrinkles in the finished article are avoided, and a clear article is produced. In view of the fact that the measuring and flow is entirely by gravity action, the expense due to the vacuum system is avoided. Moreover, the amount of glass exposed is only the stream, and that only at the point of delivery. The amount of fuel required to retain the glass in the fluid condition is, therefore, not only small, but in view of the fact that the glass mass is entirely enclosed, and only exposed at the point of delivery in the form of a thin stream, the radiated heat will be comparatively small.

Since each blank mold is maintained stationary while being filled, it is only the mold to be filled, which remains stationary, while all of the other molds as well as all of the other mechanisms, even the set cooperating with that mold, are kept in continuous movement, and their movement is not interrupted. The shocks due to the stopping and starting of the mass due to the inertia thereof, therefore, are restricted to the mass of a single mold, its carrier and carriage, while the heavy mass remains in continuous movement and is not stopped except when the entire machine is to be stopped.

While various combinations and sub-combinations have been described and illustrated in detail, it is to be understood that the sub-combinations are capable of use independent of other sub-combinations. It is further obvious that various changes may be made in the details of construction and operation and manipulation without departing from the spirit of this invention. It is therefore, to be understood that this invention is not to be limited or restricted to the details described and shown.

Having thus described the invention, what is claimed is:

1. In a glass shaping machine having a source of supply adapted to deliver a stream of glass, a plurality of shaping molds, means for moving said molds to position them successively in the path of the stream of glass, so as to deliver the glass directly to said molds, means for cutting the stream as a mold moves out of the stream path, means adapted to move the mold to be filled into the stream path at a lower level than the filled mold leaves it, and means for successively shaping the glass in said molds.

2. In a glass shaping machine having a source of supply adapted to deliver a stream of glass, a plurality of molds, means for moving said molds successively into and out of the path of the stream of glass so as to deliver the glass directly to said molds, and means for successively moving said molds upwardly, adapted to cause the molds to enter the stream path at a lower level and leave it at a higher level, and means for successively shaping the glass in said molds.

3. In a glass shaping machine having a source of supply adapted to deliver a stream of glass, a plurality of molds, means for moving said molds successively into and out of the path of the stream of glass, adapted to cause a filled mold to leave the stream path at a higher level than the succeeding mold to be filled enters the stream path, and means for cutting the stream as the filled mold moves out of the stream path, adapted to permit the stream to drop to the level of the succeeding mold while it moves into the stream path.

4. In a glass shaping machine having a source of supply adapted to deliver a stream of glass, a plurality of molds, means for moving said molds successively into and out of the path of the stream of glass, adapted to cause a filled mold to leave the stream path at a higher level than the succeeding mold to be filled enters the stream path, and means for momentarily cutting and again releasing the stream while the filled mold moves out of the stream path, adapted to leave the stream substantially uninterrupted in order to permit the freed stream to drop to the level of and into the succeeding mold while it moves into and when it reaches the stream path.

5. In a glass shaping machine having a source of supply adapted to deliver the glass, a traveling frame, a mold mounted for movement with and relative to said frame, means for maintaining said mold at the point of delivery, while said frame continues in its movement, and means for elevating said mold while so maintained.

6. In a glass shaping machine having a source of supply adapted to deliver the glass, a traveling frame, a mold mounted for movement with and relative to said frame, means for retarding said mold relative to said frame at the point of delivery, and means for elevating said mold while so retarded.

7. In a glass shaping machine having a source of supply adapted to deliver the glass, a traveling frame, a mold mounted for movement with and relative to said frame and adapted to receive the glass from said source, means for advancing said mold relative to said frame, and means for depressing said mold while so advanced.

8. In a glass shaping machine having a source of supply adapted to deliver the glass, a traveling frame, a mold mounted for movement with and relative to said frame and adapted to receive the glass from said source, means for advancing and retarding said mold relative to said frame, and means for elevating and depressing said mold.

9. In a glass shaping machine having a source of supply adapted to deliver the glass, a traveling frame, a mold mounted for movement with and relative to said frame, means for advancing said mold relative to said frame, means for retarding said mold relative to said frame at the point of delivery, and means for elevating and depressing said mold while so retarded and advanced respectively.

10. In a glass shaping machine having a source of supply adapted to deliver a stream of glass, a traveling frame, a mold mounted for movement with and relative to said frame and adapted to receive the glass stream, means for maintaining said mold at the point of delivery while the frame continues in its movement, and means for cutting the glass stream.

11. In a glass shaping machine having a source of supply adapted to deliver a stream of glass, a traveling frame, a mold mounted for movement with and relative to said frame and adapted to receive the glass stream, means for maintaining said mold at the point of delivery while the frame continues in its movement, and means for cutting the glass stream, when said mold again moves with said frame.

12. In a glass shaping machine having a source of supply adapted to deliver a stream of glass, a traveling frame, a mold mounted for movement with and relative to said frame, adapted to cause said mold to remain in the path of the stream while said frame continues in its movement.

13. In a glass shaping machine having a source of supply adapted to deliver a stream of glass, a traveling frame, a mold mounted for movement with and relative to said frame, adapted to cause said mold to remain in the path of the stream while said frame continues in its movement, and means for cutting the glass stream when said mold again moves with said frame.

14. In a glass shaping machine having a source of supply adapted to deliver a stream of glass, a traveling frame, a mold mounted for movement with and relative to said frame, adapted to cause said mold to remain in the path of the stream while said frame continues in its movement, and means for elevating said mold when in the stream path.

15. In a glass shaping machine having a source of supply adapted to deliver a stream of glass, a traveling frame, a mold mounted for movement with and relative to said frame, adapted to cause said mold to remain in the path of the stream while said frame continues in its movement, means for elevating said mold when in the stream path, and for again depressing said mold when out of said stream path.

16. In a glass shaping machine having a source of supply adapted to deliver a stream of glass, a traveling frame, a mold mounted for movement with and relative to said frame, adapted to cause said mold to remain in the path of the stream while said frame continues in its movement, means for elevating said mold when in the stream path, and means for cutting the glass stream when said mold again moves with said frame.

17. In a glass shaping machine having a source of supply adapted to deliver a stream of glass, a traveling frame, a mold mounted for movement with and relative to said frame, adapted to cause said mold to remain in the path of the stream while said frame continues in its movement, means for elevating said mold when in the stream path, and for again depressing said mold when out of said stream path, and means for cutting the glass stream when said mold again moves with said frame.

18. In a glass shaping machine having a source of supply adapted to deliver a stream of glass, a traveling frame, a series of molds mounted for movement with and relative to said frame, means for successively moving said molds in the path of the stream, and means for maintaining said molds in the stream path to be filled.

19. In a glass shaping machine having a source of supply adapted to deliver a stream of glass, a traveling frame, a series of molds mounted for movement with and relative to said frame, means for successively moving said molds in the path of the stream, and means for maintaining said molds in the stream path to be filled, adapted to move a succeeding mold adjacent the preceding mold in position to be moved into the stream path when the preceding mold is filled.

20. In a glass shaping machine having a source of supply adapted to deliver a stream of glass, a traveling frame, a series of molds mounted for movement with and relative to said frame, means for successively moving said molds in the path of the stream, means for maintaining said molds in the stream path to be filled, and means for elevating said molds while being moved in the stream path.

21. In a glass shaping machine having a source of supply adapted to deliver a stream of glass, a traveling frame, a series of molds mounted for movement with and relative to said frame, means for successively moving said molds in the path of the stream, means for maintaining said molds in the stream path to be filled, adapted to move a succeeding mold adjacent the preceding mold in position to be moved into the stream path when the preceding mold is filled, and means for elevating said molds while being moved in the stream path.

22. In a glass shaping machine having a source of supply adapted to deliver a stream of glass, a traveling frame, a series of molds mounted for movement with and relative to said frame, means for successively moving said molds in the path of the stream, means for maintaining said molds in the stream path to be filled, and means for elevating said molds while being moved in the stream path and for depressing said molds after filling.

23. In a glass shaping machine having a source of supply adapted to deliver a stream of glass, a traveling frame, a series of molds mounted for movement with and relative to said frame, means for successively moving said molds in the path of the stream, means for maintaining said molds in the stream path to be filled, and means for cutting the stream when said molds are filled.

24. In a glass shaping machine having a source of supply adapted to deliver a stream of glass, a traveling frame, a series of molds mounted for movement with and relative to said frame, means for successively moving said molds in the path of the stream, means for maintaining said molds in the stream path to be filled, adapted to move a succeeding mold adjacent the preceding mold in position to be moved into the stream path when the preceding mold is filled, and means for momentarily cutting the stream path when the preceding mold is filled and when the succeeding mold moves in the stream path.

25. In a glass shaping machine having a source of supply adapted to deliver a stream of glass, a traveling frame, a series of molds mounted for movement with and relative to said frame, means for successively moving said molds in the path of the stream, means for maintaining said molds in the stream path to be filled, adapted to move a succeeding mold adjacent the preceding mold in position to be moved into the stream path when the preceding mold is filled, means for elevating said molds while being moved in the stream path, and means for momentarily cutting the stream path when the preceding mold is filled and when the succeeding mold moves in the stream path.

26. In a glass shaping machine having a source of supply adapted to deliver a stream of glass, a mold, glass shaping mechanism, means for moving said mold into the stream path, means for cutting the glass stream when the mold is filled, and means for moving the filled mold into cooperative relation with said shaping mechanism, adapted to leave the glass stream uninterrupted.

27. In a glass shaping machine having a source of supply adapted to deliver a stream of glass, a mold, glass shaping mechanism, means for moving said mold into the stream path, means for elevating said mold, and means for moving the filled mold in cooperative relation with said shaping mechanism.

28. In a glass shaping machine having a source of supply adapted to deliver a stream of glass, a mold, glass shaping mechanism, means for moving said mold into the stream path, means for elevating said mold while being moved into the stream path, and means for moving the filled mold in cooperative relation with said shaping mechanism.

29. In a glass shaping machine having a source of supply adapted to deliver a stream of glass, a mold, glass shaping mechanism, means for moving said mold into the stream path, means for elevating said mold, means for moving the filled mold in cooperative relation with said shaping mechanism, and means for depressing said mold.

30. In a glass shaping machine having a source of supply adapted to deliver a stream of glass, a mold, glass shaping mechanism, means for moving said mold into the stream path, means for elevating said mold, means for moving the filled mold in cooperative relation with said shaping mechanism, means for moving said mold out of cooperative relation with said shaping mechanism, and means for depressing said mold.

31. In a glass shaping machine having a source of supply adapted to deliver a stream of glass, a blank mold, shaping mechanism, a finishing mold, means for moving said blank mold into the stream path, means for cutting the glass stream when said blank mold is filled, adapted to leave the glass stream uninterrupted, and means for successively moving the blank into cooperative relation with said shaping mechanism and said finishing mold.

32. In a glass shaping machine having a source of supply adapted to deliver a stream of glass, a blank mold, shaping mechanism, a finishing mold, means for moving said blank mold into the stream path, means for elevating said blank mold, and means for successively moving the blank into cooperative relation with said shaping mechanism and said finishing mold.

33. In a glass shaping machine having a source of supply adapted to deliver a stream of glass, a blank mold, shaping mechanism, a finishing mold, means for moving said blank mold into the stream path, means for elevating said blank mold, means for successively moving the blank into cooperative relation with said shaping mechanism and said finishing mold, and means for depressing said blank mold.

34. In a glass shaping machine having a source of supply adapted to deliver a stream of glass, a mold, glass shaping mechanism, means for moving said mold into the stream path, means for elevating said mold, adapted to fill said mold, and means for moving the filled and elevated mold into cooperative relation with said shaping mechanism.

35. In a glass shaping machine having a source of supply adapted to deliver a stream of glass, a mold, glass shaping mechanism, means for moving said mold into the stream path, means for elevating said mold, adapted to fill said mold, means for moving the filled and elevated mold into cooperative relation with said shaping mechanism, means for returning said mold, and means for depressing the returned mold.

36. In a glass shaping machine having a source of supply adapted to deliver a stream of glass, a mold, glass shaping mechanism, means for moving said mold into the stream path, means for elevating said mold, adapted to fill said mold, means for moving the filled and elevated mold into cooperative relation with said shaping mechanism, means for ejecting the shaped article, means for returning said mold, and means for moving said mold out of the path of ejection of the shaped article.

37. In a glass shaping machine having a source of supply adapted to deliver a stream of glass, a mold, glass shaping mechanism, means for moving said mold into the stream path, means for elevating said mold, adapted to fill said mold, means for moving the filled and elevated mold into cooperative relation with said shaping mechanism, and means for returning said mold to a depressed position laterally of said shaping mechanism.

38. In a glass shaping machine having a source of supply adapted to deliver a stream of glass, a mold, glass shaping mechanism, means for moving said mold into the stream path, means for elevating said mold, adapted to fill said mold, means for moving the filled and elevated mold into cooperative relation with said shaping mechanism, means for returning said mold, means for depressing the returned mold, and means for shifting said mold laterally of said shaping mechanism.

39. In a glass shaping machine having a source of supply adapted to deliver a stream of glass, a blank mold, shaping mechanism, a finishing mold, means for moving said blank mold into the stream path, means for elevating said blank mold, adapted to fill said blank mold, and means for moving the filled and elevated blank mold to position the blank in cooperative relation with said shaping mechanism and said finishing mold.

40. In a glass shaping machine having a source of supply adapted to deliver a stream of glass, a blank mold, shaping mechanism, a finishing mold, means for moving said blank mold into the stream path, means for elevating said blank mold, adapted to fill said blank mold, means for moving the filled and elevated blank mold to position the blank in cooperative relation with said shaping mechanism and said finishing mold, and means for returning said blank mold to a depressed position laterally of said finishing mold.

41. In a glass shaping machine having a source of supply adapted to deliver a stream of glass, a blank mold, shaping mechanism, a finishing mold, means for moving said blank mold into the stream path, means for elevating said blank mold, adapted to fill said blank mold, means for moving the filled and elevated blank mold to position the blank in cooperative relation with said shaping mechanism and said finishing mold, means for moving said finishing mold to eject the shaped article, and means for returning said blank mold to a depressed position laterally of said finishing mold.

42. In a glass shaping machine having a source of supply adapted to deliver a stream of glass, a traveling frame, a mold mounted for movement with and relative to said frame, glass shaping mechanism mounted on said frame, means for maintaining said mold in the path of the glass stream to be filled, while said frame continues in its movement, and means for moving said mold in cooperative relation with said shaping mechanism.

43. In a glass shaping machine having a source of supply adapted to deliver a stream of glass, a traveling frame, a mold mounted for movement with and relative to said frame, glass shaping mechanism mounted on said frame, means for maintaining said mold in the path of the glass stream to be filled, while said frame continues in its movement, means for moving said mold in cooperative relation with said shaping mechanism, and means for returning said mold adapted to position it laterally of said shaping mechanism.

44. In a glass shaping machine having a source of supply adapted to deliver a stream of glass, a traveling frame, a mold mounted for movement with and relative to said frame, glass shaping mechanism mounted on said frame, means for maintaining said mold in the path of the glass stream to be filled, while said frame continues in its movement, means for elevating said mold, and means for moving the filled and elevated mold into cooperative relation with said shaping mechanism.

45. In a glass shaping machine having a source of supply adapted to deliver a stream of glass, a traveling frame, a mold mounted for movement with and relative to said frame, glass shaping mechanism mounted on said frame, means for maintaining said mold in the path of the glass stream to be filled, while said frame continues in its movement, means for elevating said mold, means for moving the filled and elevated mold into cooperative relation with said shaping mechanism, and means for returning said mold to a depressed position.

46. In a glass shaping machine having a source of supply adapted to deliver a stream of glass, a traveling frame, a mold mounted for movement with and relative to said frame, glass shaping mechanism mounted on said frame, means for maintaining said mold in the path of the glass stream to be filled, while said frame continues in its movement, means for elevating said mold, means for moving the filled and elevated mold into cooperative relation with said shaping mechanism, and means for returning said mold to a depressed position, laterally of said shaping mechanism.

47. In a glass shaping machine having a source of supply adapted to deliver a stream of glass, a traveling frame, a blank mold mounted for movement with and relative to said frame, glass shaping mechanism and a finishing mold both mounted on said frame, means for maintaining said blank mold in the path of the glass stream to be filled, while said frame continues in its movement, and means for moving said blank mold to position the blank in cooperative relation with said shaping mechanism and said finishing mold.

48. In a glass shaping machine having a source of supply adapted to deliver a stream of glass, a traveling frame, a blank mold mounted for movement with and relative to said frame, glass shaping mechanism and a finishing mold both mounted on said frame, means for maintaining said blank mold in the path of the glass stream to be filled, while said frame continues in its movement, means for elevating said blank mold, and means for moving said elevated and filled blank mold to position the blank in cooperative relation with said shaping mechanism and said finishing mold.

49. In a glass shaping machine having a source of supply adapted to deliver a stream of glass, a traveling frame, a blank mold mounted for movement with and relative to said frame, glass shaping mechanism and a finishing mold both mounted on said frame, means for maintaining said blank mold in the path of the glass stream to be filled, while said frame continues in its movement, means for elevating said blank mold, means for moving said elevated and filled blank mold to position the blank in cooperative relation with said shaping mechanism and said finishing mold, and means for returning said blank mold to a depressed position laterally of said finishing mold.

50. In a glass shaping machine having a source of supply adapted to deliver a stream of glass, a traveling frame, a blank mold mounted for movement with and relative to said frame, glass shaping mechanism and a finishing mold both mounted on said frame, means for maintaining said blank mold in the path of the glass stream to be filled, while said frame continues in its movement, means for elevating said blank mold, means for moving said elevated and filled blank mold to position the blank in cooperative relation with said shaping mechanism and said finishing mold, means for moving said finishing mold to eject the shaped article, and means for returning said blank mold to a depressed position laterally of said finishing mold.

51. In a glass shaping machine having a source of supply adapted to deliver a stream of glass, a mold, shaping mechanism, means for moving said mold in the path of the glass stream to be filled, means for cutting the stream adapted to leave the glass stream uninterrupted, means for moving said mold into cooperative relation with said shaping mechanism, and means for operating said shaping mechanism, adapted to shape the glass in said mold.

52. In a glass shaping machine having a source of supply adapted to deliver a stream of glass, a mold, shaping mechanism, means for moving said mold in the path of the glass stream, adapted to maintain said mold in said path to fill said mold, means for cutting the stream, adapted to leave the glass stream uninterrupted, means for moving said mold into cooperative relation with said shaping mechanism, and means for operating said shaping mechanism, adapted to shape the glass in said mold.

53. In a glass shaping machine having a source of supply adapted to deliver a stream of glass, a mold, shaping mechanism, means for moving said mold into the path of the glass stream, means for elevating said mold while being filled, means for cutting the stream, means for moving said mold into cooperative relation with said shaping mechanism, and means for operating said shaping mechanism, adapted to shape the glass in said mold.

54. In a glass shaping machine having a source of supply adapted to deliver a stream of glass, a blank mold, shaping mechanism comprising, a neck mold, and a cooperating core, means for moving said blank mold in the path of the glass stream to be filled, means for cutting the stream, adapted to leave the glass stream uninterrupted, means for moving said mold into cooperating relation with said shaping mechanism, and means for operating said shaping mechanism adapted to shape the blank to form the neck of the article.

55. In a glass shaping machine having a source of supply adapted to deliver a stream of glass, a traveling frame carrying shaping mechanism, a mold mounted for movement with and relatively to said frame, and means for positioning said mold to receive glass from the source while said frame continues in its movement.

56. In a glass shaping machine having a source of supply adapted to deliver a stream of glass, a traveling frame carrying shaping mechanism, a mold mounted for movement with and relatively to said frame, and means for maintaining said mold in the stream path while said frame continues in its movement.

57. In a glass shaping machine having a source of supply adapted to deliver a stream of glass, a traveling frame carrying shaping mechanism, a mold mounted for movement with and relatively to said frame, means for advancing said mold with respect to said shaping mechanism, and means for retarding said mold to receive glass from the source while said shaping mechanism again advances on said mold.

58. In a glass shaping machine having a source of supply adapted to deliver a stream of glass, a traveling frame carrying a series of shaping mechanisms, a series of molds mounted for movement with and relative to said frame, and means for positioning a mold to receive glass from said supply while said frame, the shaping mechanisms thereon and the remaining molds continue in their movement.

59. In a glass shaping machine having a source of supply adapted to deliver a stream of glass, a traveling frame carrying a series of shaping mechanisms, a series of molds mounted for movement with and relative to said frame, means for advancing said molds with respect to their shaping mechanisms, and means for successively retarding the advanced molds at the source to receive glass while their corresponding shaping mechanism again advance on said molds.

60. In a glass shaping machine having a source of supply adapted to deliver a stream of glass, a mold mounted for movement into and out of the path of the glass stream, and means movable with said mold, adapted to cut the glass stream and adapted to support the part of the stream cut off.

61. In a glass shaping machine having a source of supply adapted to deliver a stream of glass, a mold mounted for movement into and out of the path of the glass stream, and means for cutting the glass stream adapted to support the cut part of the stream flowing into said mold.

62. In a glass shaping machine having a source of supply adapted to deliver a stream of glass, a mold mounted for movement into and out of the path of the glass stream, and means movable with said mold, adapted to retain the cut part of the stream flowing into the mold against lateral movement.

63. In a glass shaping machine having a source of supply adapted to deliver a stream of glass, a mold mounted for movement into and out of the path of the glass stream, and means movable with said mold, adapted to cut but leave the glass stream uninterrupted.

64. In a glass shaping machine having a source of supply adapted to deliver a stream of glass, a mold mounted for movement into and out of the path of the glass stream, and means movable with said mold, but transversely to the mold movement, adapted to cut the glass stream.

65. In a glass shaping machine having a source of supply adapted to deliver a stream of glass to a mold, stream cutting means, having means adapted to retain the cut part of the stream upon movement of the mold.

66. In a glass shaping machine having a source of supply adapted to deliver a stream of glass to a mold, a pair of cooperating stream cutting elements, means for operating said elements to cut the stream, and means adapted to retain the cut part of the stream upon movement of the mold.

67. In a glass shaping machine having a source of supply adapted to deliver a stream of glass to a mold, a stream cutter having means below its cutting edge adapted to retain the cut part of the stream upon movement of the mold.

68. In a glass shaping machine having a source of supply adapted to deliver a stream of glass to a mold, a pair of cooperating cutting elements having means below their cutting edges, adapted to retain the cut part of the stream upon movement of the mold.

69. In a glass shaping machine having a source of supply adapted to deliver a stream of glass to a mold, a stream cutter having a downwardly projecting ledge spaced from its cutting edge, adapted to retain the cut part of the stream upon movement of the mold.

70. In a glass shaping machine having a source of supply adapted to deliver a stream of glass to a mold, a pair of cooperating cutting elements having downwardly projecting ledges spaced from their cutting edges, adapted to retain the cut part of the stream upon movement of the mold.

In testimony whereof I affix my signature this 25 day of June, 1917.

THOMAS C. MOORSHEAD.